United States Patent [19]

Matsuoka

[11] Patent Number: 4,496,942

[45] Date of Patent: Jan. 29, 1985

[54] METHOD AND APPARATUS FOR DOOR OPERATION REMOTE CONTROL

[75] Inventor: Shigeru Matsuoka, Hitachi, Japan

[73] Assignee: Hitachi, Ltd., Tokyo, Japan

[21] Appl. No.: 355,106

[22] Filed: Mar. 5, 1982

[30] Foreign Application Priority Data

Mar. 10, 1981 [JP] Japan ................................ 56-33078

[51] Int. Cl.[3] ........................ H04B 7/00; E05F 15/10; G05D 3/08

[52] U.S. Cl. ........................................ 340/696; 49/25; 318/267

[58] Field of Search .............. 340/696, 825.69, 825.72, 340/309.15; 318/16, 267; 455/91, 95, 127; 307/141, 590, 592, 600; 328/72, 74; 49/25, 26, 28

[56] References Cited

U.S. PATENT DOCUMENTS

| | | | |
|---|---|---|---|
| 4,241,331 | 12/1980 | Taeuber et al. | 340/696 |
| 4,272,766 | 6/1981 | Stucker et al. | 340/696 |
| 4,360,801 | 11/1982 | Duhame | 340/696 |
| 4,366,482 | 12/1982 | Remes et al. | 340/696 |
| 4,370,565 | 1/1983 | Hayden | 307/590 |
| 4,405,923 | 9/1983 | Matsuoka et al. | 340/696 |

FOREIGN PATENT DOCUMENTS

| | | | |
|---|---|---|---|
| 612398 | 11/1948 | United Kingdom | 340/696 |

*Primary Examiner*—Donald J. Yusko

*Attorney, Agent, or Firm*—Antonelli, Terry & Wands

[57] ABSTRACT

Apparatus and method for door operation remote control. A radio transmitter transmits a door operation command signal for a predetermined time when the operator operates a switch, irrespective of a turn-on time of the switch. Upon receipt of the door operation command signal from the radio transmitter, a door operation control signal is generated to effect the operation of a door.

12 Claims, 31 Drawing Figures

FIG. 13

| $D_H$ \ $D_L$ | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 0 | $2^3$ | $S_4$ (0) | $S_8$ (0) | $S_{12}$ (0) | $S_{16}$ (0) | ($D_3$) | SP (0) | ($D_9$) | SP (0) | ($D_{15}$) | FSP (1) | | | | ← NUMBER OF TRANSMISSIONS → | | |
| | $2^2$ | $S_3$ (0) | $S_7$ (0) | $S_{11}$ (0) | $S_{15}$ (0) | ($D_2$) | ($D_6$) | ($D_8$) | ($D_{12}$) | ($D_{14}$) | FSP (0) | | | | 100-th DIGIT | 10-th DIGIT | 1 st DIGIT |
| | $2^1$ | $S_2$ (0) | $S_6$ (0) | $S_{10}$ (0) | $S_{14}$ (0) | ($D_1$) | ($D_5$) | ($D_7$) | ($D_{11}$) | ($D_{13}$) | FSP (0) | | | | | | |
| | $2^0$ | $S_1$ (0) | $S_5$ (0) | $S_9$ (0) | $S_{13}$ (0) | ST (1) | ($D_4$) | ST (1) | ($D_{10}$) | ST (1) | FSP (0) | | | | | | |

FIG. 15

| C B A | NUMBER OF TRANS-MISSIONS |
|---|---|
| 0 0 0 | 4 |
| 0 0 1 | 8 |
| 0 1 0 | 12 |
| 0 1 1 | 16 |
| 1 0 0 | 20 |
| 1 0 1 | 24 |
| 1 1 0 | 28 |
| 1 1 1 | $\infty$ |

| C B A | TRANSMISSION TIME (sec) |
|---|---|
| 0 0 0 | 0.32 |
| 0 0 1 | 0.64 |
| 0 1 0 | 0.96 |
| 0 1 1 | 1.28 |
| 1 0 0 | 1.6 |
| 1 0 1 | 1.92 |
| 1 1 0 | 2.24 |
| 1 1 1 | ∞ |

METHOD AND APPARATUS FOR DOOR OPERATION REMOTE CONTROL

This invention relates to method and apparatus for door operation remote control which are adapted to control the open and close drive operations of a door of a garage and the like and particularly, a control method and apparatus which controls the door operation by utilizing a radio signal command.

In a prior art apparatus of this type, a radio signal representative of a door operation command transmitted from a transmitter is received by a receiver and fed, as a door operation command signal, to a door operation control circuit which in turn generates a door operation control signal for actuation of a door operation (open and close) drive device. The radio signal representative of the door operation command is normally indistinguishable for commanding opening and closing of the door. Accordingly, when the door is in a closed condition, the door operation drive device receiving the radio signal causes the door to open and conversely, when the door is in an opened condition, the device causes the door to close upon receipt of the radio signal. In addition, when the radio signal is received while the door is being driven in one direction, the door drive direction is inverted. Also, when the door in process of closing comes across an obstruction, the collision is detected by an obstruction detector switch either to drive the door in the open direction or else to stop it. Such a door operation remote control apparatus is disclosed in U.S. Pat. No. 3,906,348 and in U.S. patent application Ser. No. 123,086 filed in Feb. 12, 1980.

The prior art door operation remote control apparatus, however, entails the following disadvantages.

(1) When a door operation command switch included in the transmitter continues to be depressed, the door operation control circuit continues to generate a control signal which commands the drive of the door. As a result, even when the obstruction detector switch is actuated, the door continues to exert its moving force on the obstruction, leading to possibility of a serious accident;

(2) As the time for depressing a transmitter switch is prolonged, so the consumption of a power source battery of the transmitter disadvantageously proceeds; and (3) It is conceivable that when the transmitter is moved with the transmitter switch kept depressed, an electromagnetic wave shielding body appears temporarily between the transmitter and the receiver, resulting in an a temporary interruption of an electromagnetic wave reaching the receiver. In the event of such an interruption, the receiver will undergo plural receptions of the operation command signal and the door operation control will be effected in opposition to the intention of the operator.

The counteract item (1) above, it may be thought of to discriminate a continuous turn-on time of the received signal as disclosed in U.S. Pat. No. 4,119,896. A circuit devised for such countermeasure, however, will be complicated and expensive.

To counteract items (2) and (3), no countermeasure has hitherto been proposed.

An object of this invention is therefore to provide a door operation remote control method and apparatus utilizing an electromagnetic wave which can prevent errors in door operation and at the same time unwanted power consumption in the transmitter.

To accomplish the above object, according to this invention, when a push-button switch of the transmitter adapted to transmit a door operation command signal is kept closed beyond a predetermined time, the transmission of the door operation command signal is automatically stopped at the termination of the predetermined time so that inconvenience due to the continuous prolonged transmission of the door operation command signal may be eliminated.

The above and other objects will be made apparent from the following detailed description of a preferred embodiment taken in conjunction with the accompanying drawings, in which:

FIG. 13 is a diagrammatic representation showing an information storage format in a RAM;

FIG. 15 is a diagrammatic representation showing an example of setting the number of transmissions;

Figure 1:
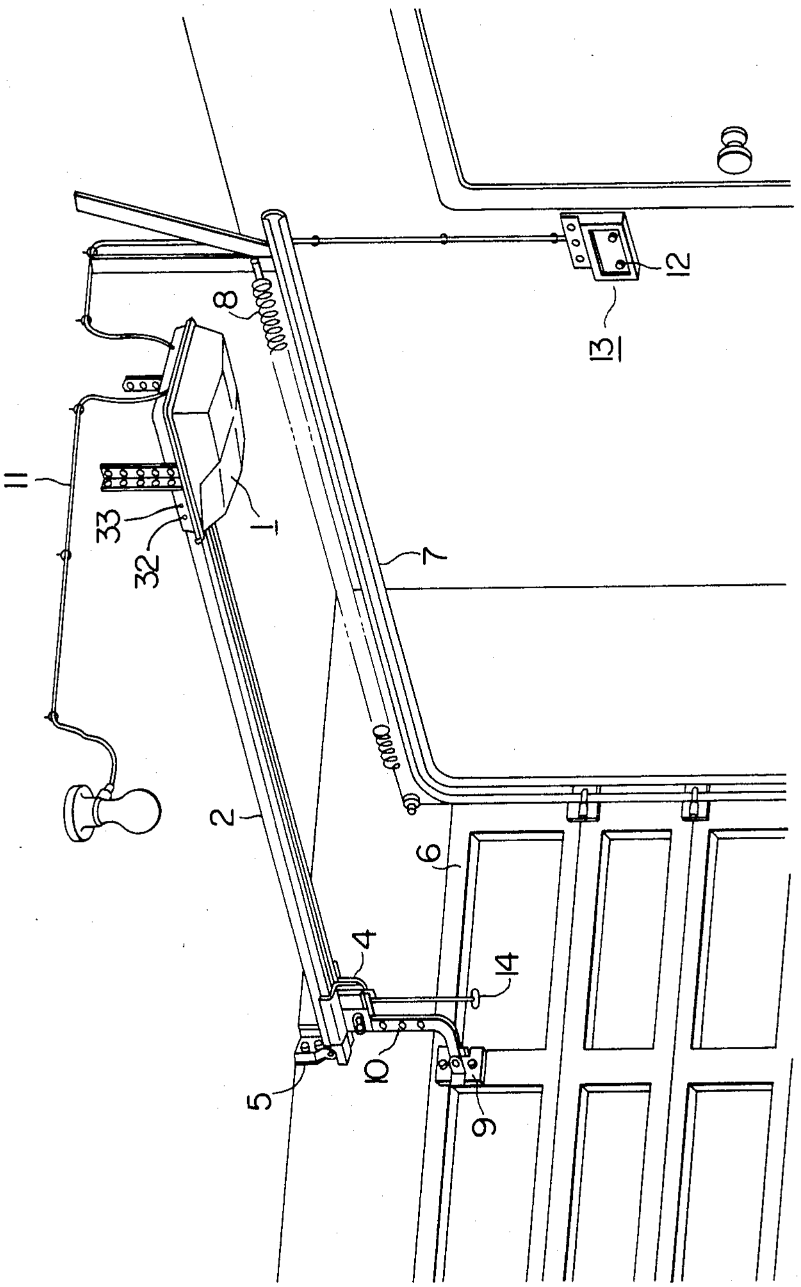
FIG. 1 is a perspective view of a door operating apparatus.

As shown in FIG. 1, a garage door operating device for which a control apparatus according to the present invention is used comprises essential parts including a body 1 housing a driving mechanism, a rail 2 coupled with the body 1, and a trolley 4 guided by the rail 2 and adapted to be horizontally moved, the trolley 4 being secured to a roller chain actuated by the driving force of the body 1. The body 1 is hung from the ceiling of the garage by a hanger, and an end of the rail 2 is secured to part of the garage by a header bracket 5. A garage door 6, on the other hand, is generally divided into several parts coupled to each other and is opened and closed along door rails 7 on both sides thereof. The weight of the garage door 6 is balanced with a door balance spring 8 and is capable of being operated manually. A door bracket 9 is secured to the garage door 6. The door bracket 9 is rotatably coupled to the trolley 4 through a door arm 10. Thus the garage door 6 is closed or opened along the door rail 7 in an interlocked relation with the trolley 4 horizontally moved along the rail 2 by actuation of the roller chain driven by the driving force of the body 1. Power is supplied to the body 1 through a power cable 11. A command for operating the body 1 is issued to the body 1 from a receiver unit 13 housing a receiver circuit for receiving a signal in the form of an electromagnetic wave or the like. The operation command to the body 1 may also be generated by depressing a push-button switch 12 mounted on the wall of the garage. Should the garage door operating device be rendered inoperative by a power failure or a like accident, a pull releasing cord 14 decouples the roller chain and the trolley 4, thus making the garage door 6 ready for manual operation.

Figure 2:
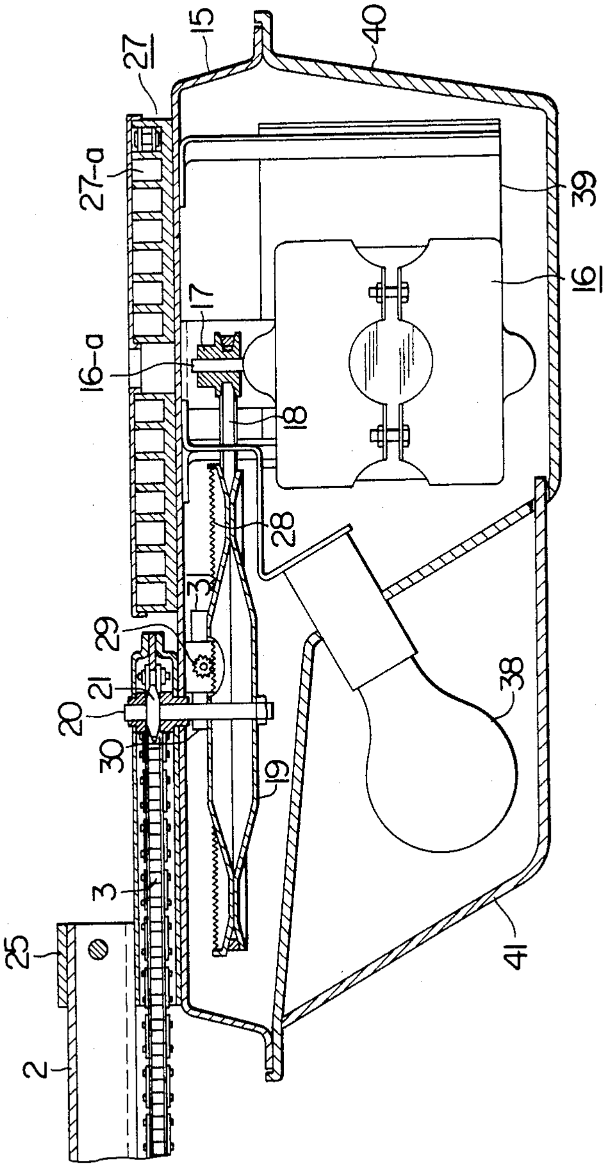
FIG. 2 is a longitudinal sectional view showing details of the body of a door operating device.
Figure 3:
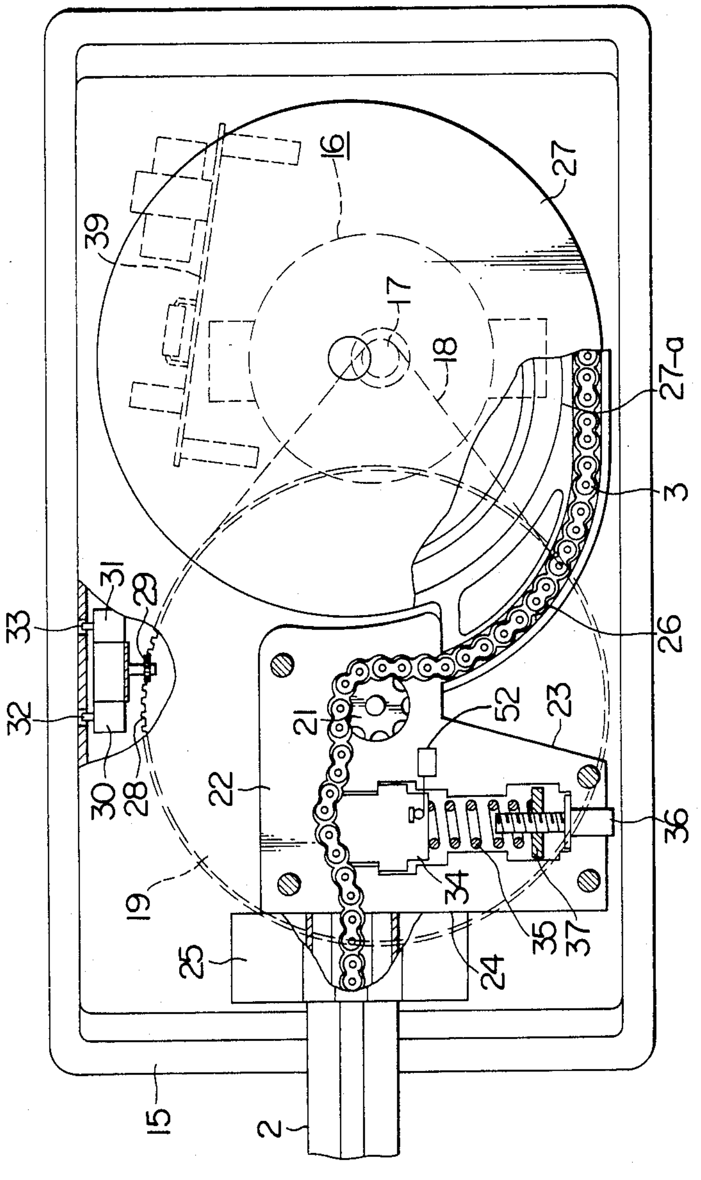
FIG. 3 is a partially cut-away plan view of the door operating device.

The construction of the body 1 of the garage door operating device will first be explained with reference to FIGS. 2 and 3. FIG. 2 is a longitudinal sectional view and FIG. 3 a partially cut-away top plan view of the body 1. The turning effort of a motor 16 secured to the lower side of a body frame 15 is transmitted to a motor pulley 17 secured to a motor shaft 16-*a*, a V-belt 18 and a large pulley 19. Further, the turning effort of the large pulley 19 is transmitted to a sprocket 21 through a sprocket shaft 20. The sprocket 21 is engaged with the roller chain as designated at 3. The rollers of the roller chain 3 are guided by a chain guide (A) 22, a chain guide (B) 23 and a chain guide (C) 24 from both sides thereof within the body 15. The rail 2 is secured to the frame 15 by a rail securing metal 25 without any difference in level or a gap with a groove formed by the chain guide (A) 22 and the chain guide (C) 24. The rollers of the roller chain 3 are guided on both sides thereof by the rail 2. The roller chain 3 taken up by the sprocket 21 is contained in a chain containing groove 27-*a* of a chain containing case 27 secured without any difference in level or a gap with the groove formed by the chain guide (A) 22 and the chain guide (B) 23.

In this construction, the rotation of the motor 16 rotates the sprocket 21, so that the roller chain 3 is reciprocated along the rail 2.

Next, a limit mechanism for limiting the horizontal movement of the trolley 4, i.e., the upper and lower limits of the operation of the garage door 6 explained with reference to FIG. 1 will be described. The amount of movement of the roller chain 3 is converted into the amount of movement of a pulley rack 28 provided on the outer periphery of the large pulley 19 rotated at the same rotational speed as the sprocket 21. The amount of movement of the pulley rack 28 is transmitted to an upper limit switch 30 and a lower limit switch 31 through a pinion 29 in mesh with the pulley rack 28. The upper limit switch 30 and the lower limit switch 31 have an upper limit adjusting knob 32 and a lower limit adjusting knob 33 respectively whereby the upper limit point and the lower limit point are freely adjustable from outside of the body.

In the case where the garage door encounters an obstruction during the downward motion thereof, it must be immediately detected and the door operation is required to be reversed, i.e., it must be moved upward for safety's sake. If the garage door strikes an obstruction during the upward motion thereof, on the other hand, it must be detected and the door must be stopped immediately for safety's sake. The abovementioned obstruction detecting mechanism will be described below. Part of the chain guide groove formed by the chain guide (A) 22, the chain guide (B) 23 and the chain guide (C) 24 is curved. An obstruction detecting device 34 is provided which is driven by the compressive force applied to the roller chain by the downward door motion or the tensile force applied to the roller chain 3 by the upward door motion. The compressive force of the obstruction detecting spring 35 for limiting the operation of the obstruction detecting device 34 is capable of being freely changed by moving a spring holding plate 37 by turning an obstruction-exerted force adjusting screw 36. Also, by the operation of the obstruction detecting switch 52 which is turned on and off in response to the movement of the obstruction detecting device 34, such an obstruction as mentioned above is detected, so that the door is reversed into upward motion from downward motion.

A lamp 38 is for illuminating the inside of the garage, which lamp 38 is adapted to be turned on or off in response to the movement of the garage door. Further, a controller 39 for controlling the motor 16 and the lamp 38 is secured within the frame 15. A body cover 40 and a lamp cover 41 cover the motor 16, the large pulley 19 and the lamp 38. The lamp cover 41 is translucent and allows the light of the lamp 38 to pass therethrough, thus brightly illuminating the inside of the garage.

The foregoing is the description of the construction of the body of the garage door operating device. Next, the rail and the trolley will be explained below with reference to FIG. 4.

Figure 4:
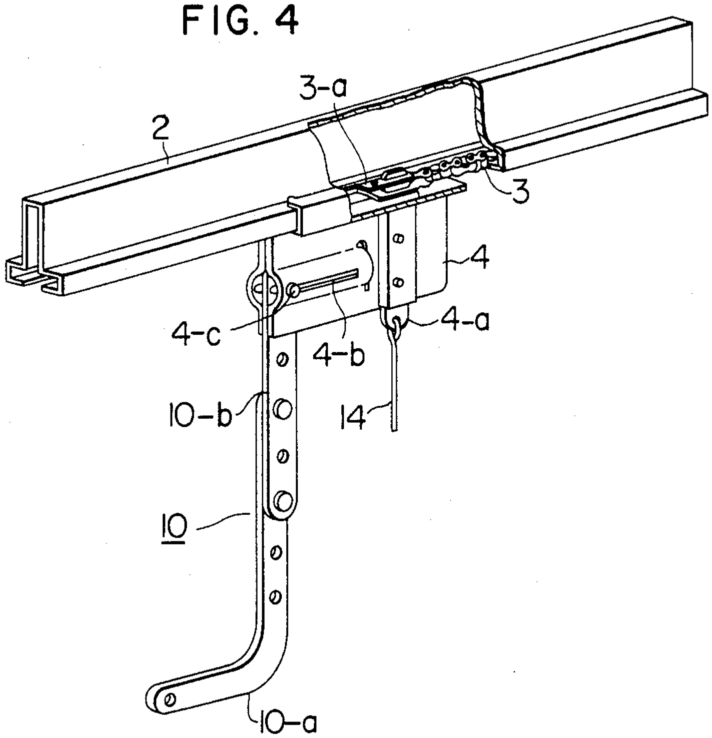
FIG. 4 is a partially cut-away perspective view showing the condition in which a rail and a trolley are coupled to each other.

A sectional structure of the rail 2 is shown in FIG. 4 in which it is formed of a thin iron plate or a plastic plate and is used to slidably guide the trolley 4 along the outer periphery thereof. The rail 2 holds the rollers of the roller chain 3 from both sides thereof thereby to reciprocate the roller chain 3 in a straight line. The trolley 4 and the roller chain 3 are coupled to each other in such a way that a connecting metal 4-*a* is inserted into a slot formed in the roller chain attachment 3-*a* secured to the end of the roller chain 3 and guided in the same manner as the roller chain 3. The connecting metal 4-*a* is slidable vertically within the trolley 4 and is normally held up by the force of a spring or the like, thus coupling the trolley 4 with the roller chain 3. In the event of a power failure or other accident when the door is required to be operated by human power by separating the garage door operating device from the door, the connecting metal 4-*a* is pulled down and separated from the roller chain attachment 3-*a*. The door arm 10 for transmitting the operation of the trolley 4 is comprised of an L-shaped door arm portion 10-*a* and a straight door arm portion 10-*b* which are coupled with the length thereof determined freely depending on the positional relation between the door 6 and the rail 2. An end of the door arm 10 is connected to the trolley 4, and the other end thereof is connected to the door 6 through the door bracket 9 shown in FIG. 1. The door arm 10 and the trolley 4 are connected with each other in such a manner that a pin 4-*c* is inserted into the slot 4-*b* formed in the trolley 4. The pin 4-*c* is normally kept pressed as shown in FIG. 4 by means of a spring or the like. This is for the purpose of absorbing the shock which will occur if the door collides with an obstruction while moving down.

Figure 5:
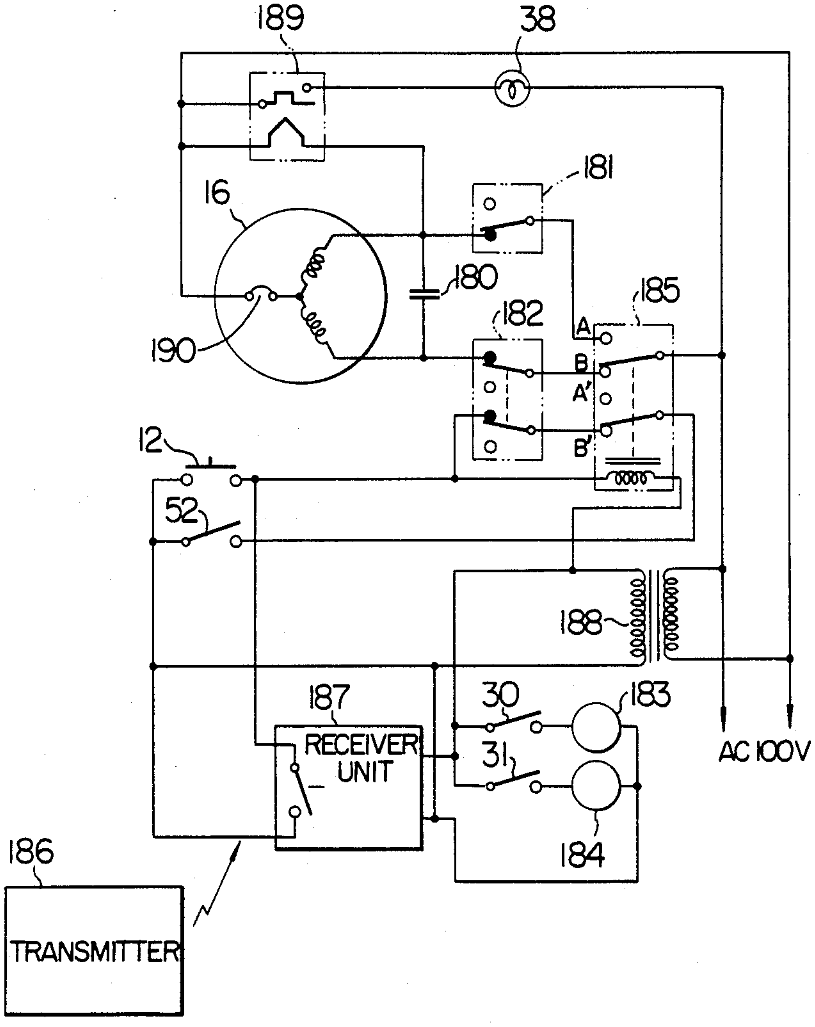
FIG. 5 is a connection diagram of a door operation control circuit.

Referring now to FIG. 5, a prior art control circuit generally used for the garage door operating device will be described which utilizes a latching relay in which each time a relay coil is excited, relay contacts are reversed and the reversed states thereof are held until the next excitation of the relay coil occurs.

The motor 16 connected with a capacitor 180 to act as a reversible motor of a capacitor split-phase type is controlled by a latching relay 185 through an upper limit switch 181 and a lower limit switch 182. The upper limit switch 181 corresponds to a relay contact of an upper limit relay 183, and this upper limit relay 183 opens the upper limit switch 181 when the upper limit switch 30 is turned on. Similarly, the lower limit switch 182 corresponds to relay contacts of a lower limit relay 184 which opens the lower limit switch 182 when the lower limit switch 31 is turned on.

The latching relay 185 is operated by an output contact 187 responsive to the reception of a signal from a transmitter 186 by the receiver unit 13 incorporating a receiving circuit, the push-button switch 12 or the obstruction detecting switch 52, these component elements being supplied with power from a transformer 188. Further, the lamp 38 is on-off controlled by means of a thermal relay 189 which can be activated simultaneously with the motor 16.

In operation, when a door operation command signal in the form of an electromagnetic wave transmitted from the transmitter 186 is received by the receiver unit 13 incorporating the receiving circuit, the contact 187 is closed and the movable contacts of the latching relay 185 are transferred to stationary contacts A and A'. The motor 16 is then rotated to move the door upwardly and at the same time, a heater of the thermal relay 189 is heated by a voltage developing across terminals of the motor 16 and the relay contact of relay 189 in the form of a bimetal structure is closed to turn on the lamp 38.

When the door reaches the upper limit, the upper limit switch 30 is closed to excite the upper limit relay 183 so that the upper limit switch 181 is opened to stop the motor 16. When the contact 187 is again closed temporarily by a subsequent command signal from the transmitter, the movable contacts of the latching relay 185 are then returned to stationary contacts B and B' and the motor 16 is rotated to move the door downwardly. At this time, the lamp 38 is again turned on in the same manner as the previous turn-on operation of the lamp. The downward motion of the door stops when the lower limit switch 31 is closed, the lower limit relay 184 is then excited and eventually the lower limit switch 182 is opened.

However, if the obstruction detecting switch 52 is closed during the downward motion of the door, the relay coil of the latching relay 185 is excited with its relay contacts transferred to the contacts A and A', causing the door operation to be reversed from the downward motion to the upward motion. This reversing operation of the door is also effected when a door operation command signal is issued from the transmitter 186 in the process of the upward motion or the downward motion of the door. The motor 16 incorporates a thermal protector 190 which is opened at high temperatures to stop the motor 16.

Instead of on-off controlling the contact 187 by means of the transmitter 186 and receiver 13 as described above, it may also be on-off controlled by the push-button switch 12.

Figure 6:
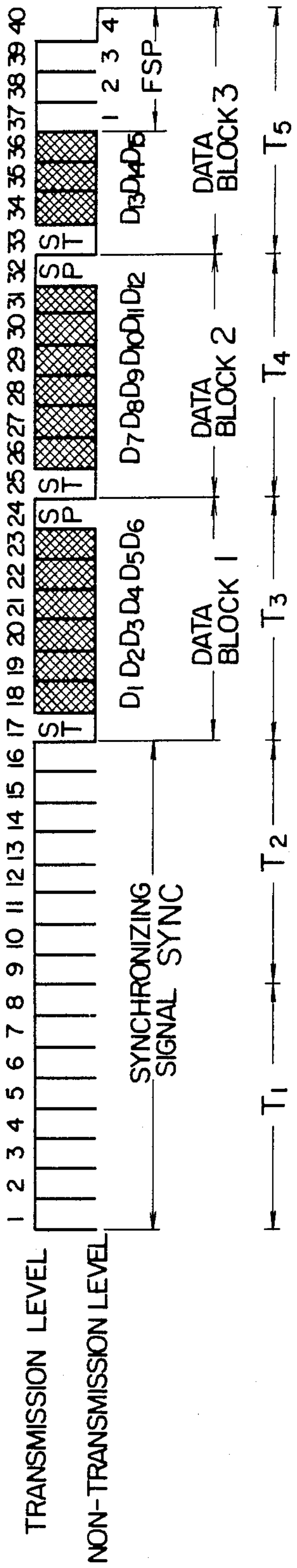
FIG. 6 is a waveform diagram of a door operation command signal.

A transmitter embodying the invention will now be described with reference to FIGS. 6 and 7. FIG. 6 shows a modulation scheme of the door operation command signal transmitted from the transmitter. The radio signal transmitted from the transmitter is so modulated as to be distinguishable from the other signals of electromagnetic waves from the other transmitters.

This scheme is generally called a non-return zero (NRZ) modulation. In this embodiment, the signal format contains a bit switch signal of 15 bits, a synchronizing signal SYNC of 16 bits, and 9 check bits ST, SP and FSP, thus having one data length of 40 bits in total. One bit has a duration of 2 msec and therefore one data length is 80 msec.

The 16 bits of the synchronizing signal SYNC are transmitted continuously from the transmitter, and the receiver measures the length of the synchronizing signal and divides it into 16 segments to calculate the length of one bit which is used as a reference period of the subsequent data sampling. The 15 bits $D_1$ to $D_{15}$ of the bit switch signal is separated by the check bits ST, SP and FSP inserted in the data to prevent sampling errors from being accumulated. Details of the construction of the transmitter based on this signal modulation scheme is disclosed in U.S. patent application Ser. No. 123,086 filed on Feb. 20, 1980. Accordingly, the transmitter is not explained herein in more detail for avoiding prolixity of description.

Figure 7:
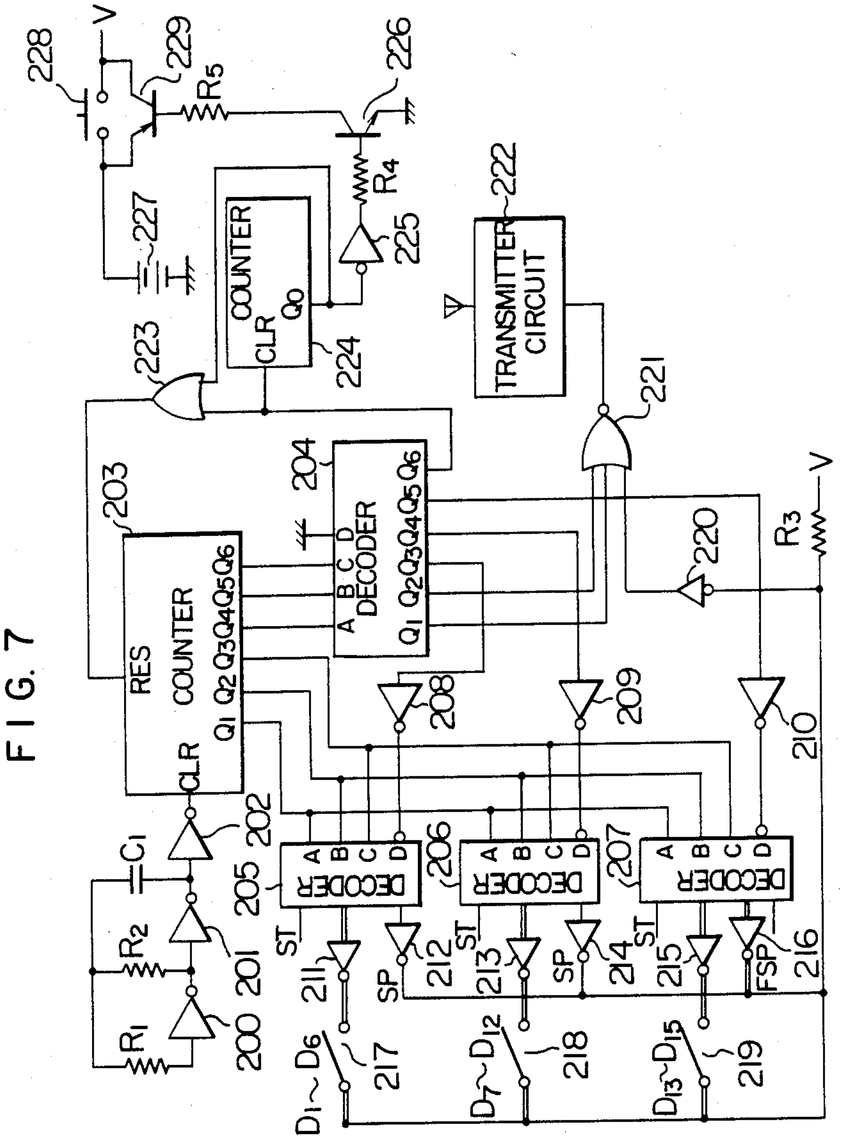
FIG. 7 is a circuit diagram of a transmitter of a door operation remote control apparatus according to the invention.

The signal modulation scheme of FIG. 6 is materialized by a circuit as exemplified in FIG. 7. Inverters 200 and 201, resistors $R_1$ and $R_2$ and a capacitor $C_1$ constitute a clock oscillator circuit which supplies a clock signal to a counter 203 via an inverter 202. The lowermost three bits of the counter 203 are coupled in parallel to input terminals A, B and C of the decoders 205, 206, and 207 and the uppermost three bits are coupled to a decoder 204. The decoder 204 decodes the input of the uppermost three bits and produces a high level signal on one of the output terminals $Q_1$ to $Q_6$ thereof. In other words, each time the counter 203 counts eight clock signals, the decoder 204 sequentially produces the high level signal on the $Q_1$ to $Q_6$ output terminals. Consequently, the uppermost three-bit outputs $Q_4$, $Q_5$ and $Q_6$ of the counter 203 are related to the outputs $Q_1$ to $Q_6$ of the decoder 204 as shown in Table 1.

TABLE 1

| Outputs of counter 203 | | | Outputs of decoder 204 | | | | | |
|---|---|---|---|---|---|---|---|---|
| $Q_4$ | $Q_5$ | $Q_6$ | $Q_1$ | $Q_2$ | $Q_3$ | $Q_4$ | $Q_5$ | $Q_6$ |
| 0 | 0 | 0 | 1 | 0 | 0 | 0 | 0 | 0 |
| 1 | 0 | 0 | 0 | 1 | 0 | 0 | 0 | 0 |
| 0 | 1 | 0 | 0 | 0 | 1 | 0 | 0 | 0 |
| 1 | 1 | 0 | 0 | 0 | 0 | 1 | 0 | 0 |
| 0 | 0 | 1 | 0 | 0 | 0 | 0 | 1 | 0 |
| 1 | 0 | 1 | 0 | 0 | 0 | 0 | 0 | 1 |

Accordingly, the decoder 204 produces outputs $Q_1$ to $Q_5$ at the timing of periods $T_1$ to $T_5$ and in synchronism with the high levels of the outputs $Q_1$ to $Q_5$, outputs amounting to 40 bits in total are produced over the periods $T_1$ to $T_5$ as will be described later in greater detail.

The outputs $Q_1$ and $Q_2$ of the decoder 204 are fed to a three-input NOR element 221, thus constituting 16 bits of the synchronizing signal SYNC. A transmitter circuit 222 continuously receives a low level signal during the periods $T_1$ and $T_2$ for the synchronizing signal SYNC. The transmitter circuit 222 is of a negative logic structure so that it fulfills transmission with the low level input and stops transmitting with the high level input.

Figure 8:
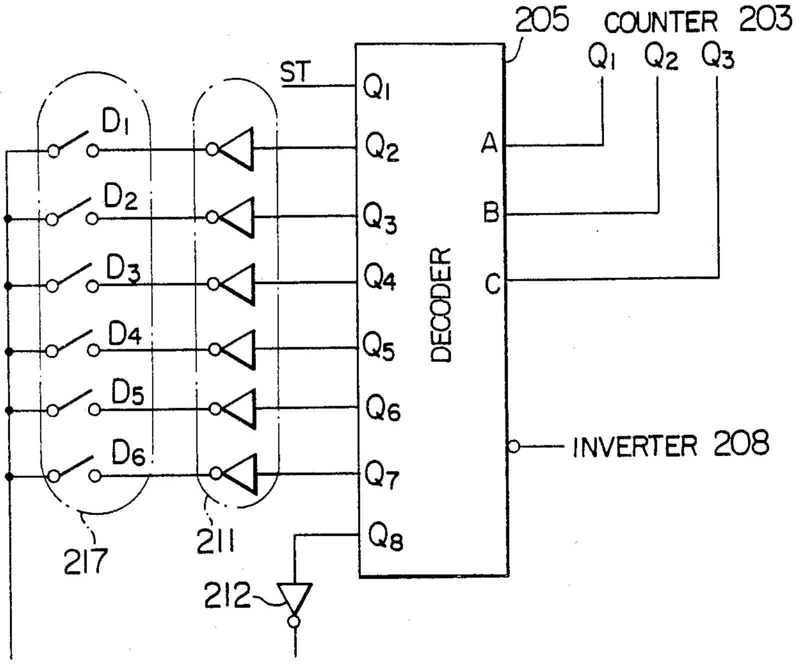
FIGS. 8 and 9 are circuit diagrams of component circuits in the circuit of FIG. 7.

The output $Q_3$ of the decoder 204 is delivered out during the period $T_3$ of FIG. 6 and fed via an inverter 208 to a decoder 205 to make it ready for decoding. The decoder 205 then decodes the lowermost three bits of the counter 203. Details of this decoder 205 and its output circuit are illustrated in FIG. 8. Eight outputs $Q_1$ to $Q_8$ of the decoder 205 are related to the lowermost three-bit outputs $Q_1$, $Q_2$ and $Q_3$ of the counter 203 as shown in Table 2.

TABLE 2

| Counter 203 | | | Decoder 205 | | | | | | | |
|---|---|---|---|---|---|---|---|---|---|---|
| $Q_1$ | $Q_2$ | $Q_3$ | $Q_1$ | $Q_2$ | $Q_3$ | $Q_4$ | $Q_5$ | $Q_6$ | $Q_7$ | $Q_8$ |
| 0 | 0 | 0 | 1 | 0 | 0 | 0 | 0 | 0 | 0 | 0 |
| 1 | 0 | 0 | 0 | 1 | 0 | 0 | 0 | 0 | 0 | 0 |
| 0 | 1 | 0 | 0 | 0 | 1 | 0 | 0 | 0 | 0 | 0 |
| 1 | 1 | 0 | 0 | 0 | 0 | 1 | 0 | 0 | 0 | 0 |
| 0 | 0 | 1 | 0 | 0 | 0 | 0 | 1 | 0 | 0 | 0 |
| 1 | 0 | 1 | 0 | 0 | 0 | 0 | 0 | 1 | 0 | 0 |
| 0 | 1 | 1 | 0 | 0 | 0 | 0 | 0 | 0 | 1 | 0 |
| 1 | 1 | 1 | 0 | 0 | 0 | 0 | 0 | 0 | 0 | 1 |

Accordingly, the output $Q_1$, the outputs $Q_2$ to $Q_7$ and the output $Q_8$ of the decoder 205 correspond to the start bit ST, data bits and stop bit SP, respectively. When the output $Q_1$ of the decoder 205 becomes high level, the corresponding output terminal is opened and therefore, no signal is applied to the input of the NOR element 221. As a result, all the inputs to the NOR element 221 are rendered low, and the transmitter circuit 222 receives the high level input and is brought into a non-transmission state. The outputs $Q_2$ to $Q_7$ of the decoder 205 are applied via six open-drain type inverters 211 to six bit switches 217, respectively. Each of the bit switches 217 is a dip switch which can be turned on or off by the operator as desired. However, since this manual setting determines the contents of data, it is necessary to set the dip switches provided for the receiver 13 to similar contents to identify the received data on the side of the receiver 13.

As shown in Table 2, the outputs $Q_2$ to $Q_7$ are sequentially rendered high and the respective bit switches 217 are sequentially applied with the low level signal. Accordingly, when the low level signal comes into a bit switch which is now turned on, current is passed through a resistor $R_3$ to render the output of an inverter 220 low, with the result that the output of the NOR element 221 is rendered low and the transmitter circuit 222 is brought into a transmitting state. In this manner, data bits $D_1$ to $D_6$ in a data block 1 of FIG. 6 correspond to bit signals $D_1$ to $D_6$ associated with the bit switches 217, and only a bit associated with a bit switch which is turned on becomes a transmission level signal and a bit associated with a bit switch which is turned off becomes a non-transmission level signal.

When the output $Q_8$ of the decoder 205 becomes high, this high level signal is inverted by an inverter 212 and again inverted by the inverter 220 to render the output of the NOR element 221 low. This means that the stop bit SP in the data block 1 is assigned the transmission level.

Next, when the output $Q_4$ of the decoder 204 is rendered high, this high level signal is fed via an inverter 209 to a decoder 206 to make it ready for decoding, and a data block 2 occurs during the period $T_4$ of FIG. 6. The operation of the decoder 206 and its output circuit is similar to that of the decoder 205 and is not explained herein for avoiding prolixity of description.

Figure 9:
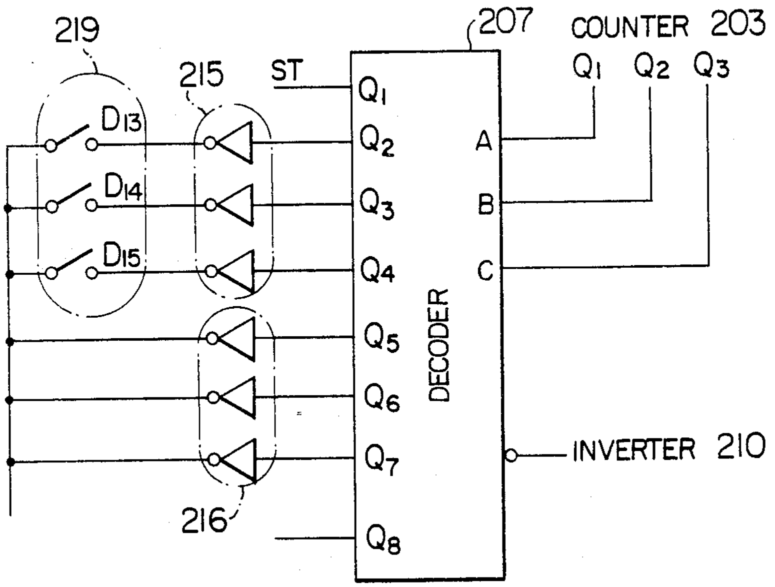

Subsequently, when the output $Q_5$ of the decoder 204 becomes high, this high level signal is fed via an inverter 210 to a decoder 207 to make it ready for decoding, and a data block 3 occurs during the period $T_5$ of FIG. 6. Details of the decoder 207 and its output circuit are illustrated in FIG. 9. Eight outputs $Q_1$ to $Q_8$ of the decoder 207 can be expressed by a tabulation similar to Table 1 that is used for expressing the outputs of the decoder 205. When the output $Q_1$ of the decoder 207 becomes high, the start bit ST in the data block 3 is rendered at the non-transmission level. The outputs $Q_2$ to $Q_4$ are fed via inverters 215 to corresponding bit switches 219. When the output $Q_2$, $Q_3$ or $Q_4$ becomes high, the transmitter circuit 222 receives the transmission level signal or non-transmission level signal in accordance with the on or off state of the corresponding bit switch 219 and data $D_{13}$, $D_{14}$ or $D_{15}$ is transmitted. The outputs $Q_5$ to $Q_7$ are applied via an inverter 216 to the inverter 220. As a result, the transmission level signal is continuously applied to the transmission circuit 222 during the period for the check bit FSP through which the outputs $Q_5$ to $Q_7$ are sequentially rendered high. With the output $Q_8$ of the decoder 207, the non-transmission level signal is applied to the transmission circuit 222 because the corresponding terminal is opened.

The above scanning process is repeated to on-off control the UHF electromagnetic wave transmitter circuit 222 of Colpitts or Hartley oscillation type by means of the output of the three-input NOR element 221, thereby producing an electromagnetic wave output (door operation command signal) having a format as shown in FIG. 6.

When the output $Q_6$ of the decoder 204 becomes high, the counter 203 is reset through a two-input OR element 223 to renew the data transmission. At the same time, a counter 224 begins to count the number of resettings of the counter 203, i.e., the number of data transmissions.

To start the operation of the transmitter, a push-button switch 228 is first depressed and closed.

By the closure of the push-button switch 228, a source voltage V of a battery 227 is supplied to all of the circuits and the transmission of the door operation command signal commences immediately. The output $Q_o$ of the counter 224 is now low and it is applied via an inverter 225 to a transistor 226 to turn it on together with simultaneous turning-on of a transistor 229, thus establishing a so-called self-holding circuit.

The counter 224 inverts its output $Q_o$ from low to high when it completes eight counts, for example. Accordingly, whenever the push-button switch 228 for transmission of the door operation command is continuously closed, the output $Q_o$ of the counter 224 becomes high when the number of data transmissions amounts to eight and this high level signal is fed via the OR element 223 to the counter 203 to reset it. Thus, the data transmission is automatically stopped at the termination of eight transmissions even when the push-button switch 228 is kept closed. Because of this disappearance of the electromagnetic wave output, power consumption in all of the circuits can be saved. In addition, if the transmitter is moving, probability of temporary interruption of the received electromagnetic wave can be reduced because the transmission period is limited to a short period.

Furthermore, in this embodiment, the number of transmission data is constant and the operation is stable since even when the push-button switch 228 is temporarily closed, the self-holding circuit operates to automatically stop the data transmission at the termination of eight transmissions.

Figure 10:
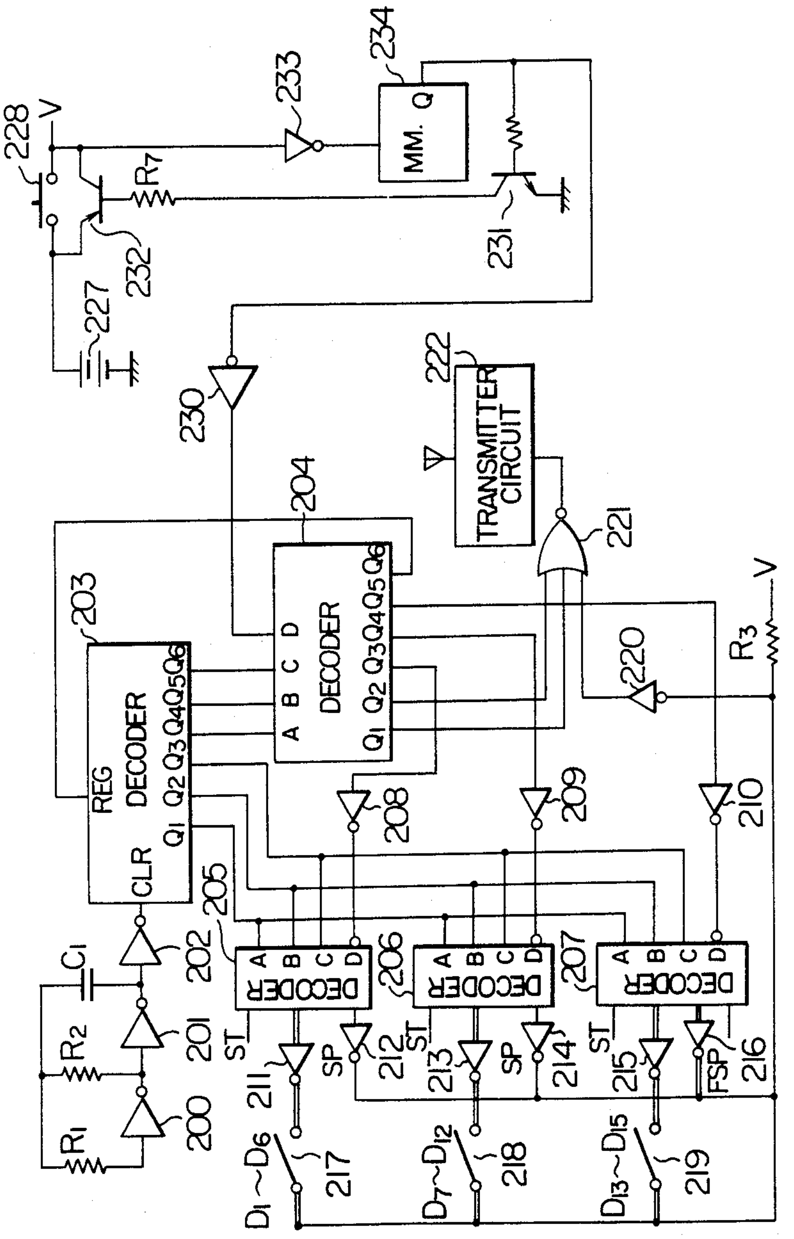
FIG. 10 is a circuit diagram showing a modification of the FIG. 7 circuit.

Referring now to FIG. 10, another embodiment of this invention will be described which is with a view to control the transmission time. The data production and processing in this embodiment is the same as that in the FIG. 7 embodiment and is not described herein.

By depressing and closing a push-button switch 228, a source voltage V of a battery 227 is supplied to the entire circuit and the transmission commences immediately. At the same time, a monostable multivibrator 234 is triggered through an inverter 233. The output Q of the monostable multivibrator 234 is then rendered high to turn on a transistor 231 and hence a transistor 232, thereby establishing a so-called self-holding circuit.

If the push-button switch 228 is closed continuously, the output Q of the monostable multivibrator 234 is fed via an inverter 230 to an input terminal D of a decoder 204 when it is again rendered low (for example, at a delay of 0.5 seconds). A high level signal thus applied to the input terminal D prevents the further delivery of outputs $Q_1$ to $Q_6$ from the decoder 204. This is because the outputs $Q_1$ to $Q_6$ are related to inputs in the form of binary codes 0000 to 0101, respectively, and when the fourth bit is "1", no input exists which is related to the output $Q_1$, $Q_2$, $Q_3$, $Q_4$, $Q_5$ or $Q_6$.

Thus, even when the push-button switch 228 is kept closed, the data transmission is automatically stopped when 0.5 seconds have elapsed from the depression of the switch 228. Accordingly, this embodiment attains the same effect as the previous embodiment.

Still another embodiment of the invention will be described which employs an integrated circuit (hereinafter referred to as IC) capable of programming procedures of processing.

Figure 11:
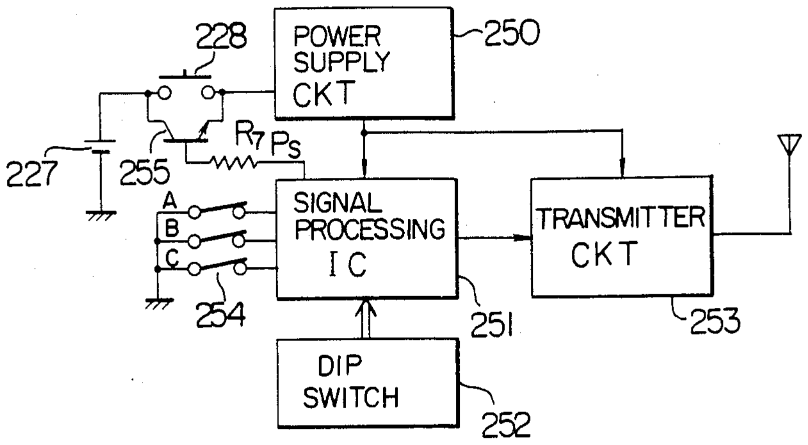
FIG. 11 is a block diagram showing another embodiment of the invention.

In a circuit arrangement of FIG. 11, the voltage of a battery 227 is supplied through a push-button switch 228 to a power supply circuit 250 which is a constant current source and from which power is supplied to all of the circuits. This circuit arrangement also comprises a dip switch 252 by means of which the operator sets codes, a transmission setting switch 254 used for setting data transmission conditions (the number of transmissions or time for transmission), a signal processing IC 251 responsive to the data transmission conditions to perform a given operation, a transmitter circuit 253 responsive to the output of the IC 251 to transmit an electromagnetic wave, and a transistor 255 which is rendered conductive under particular conditions.

Figure 14:
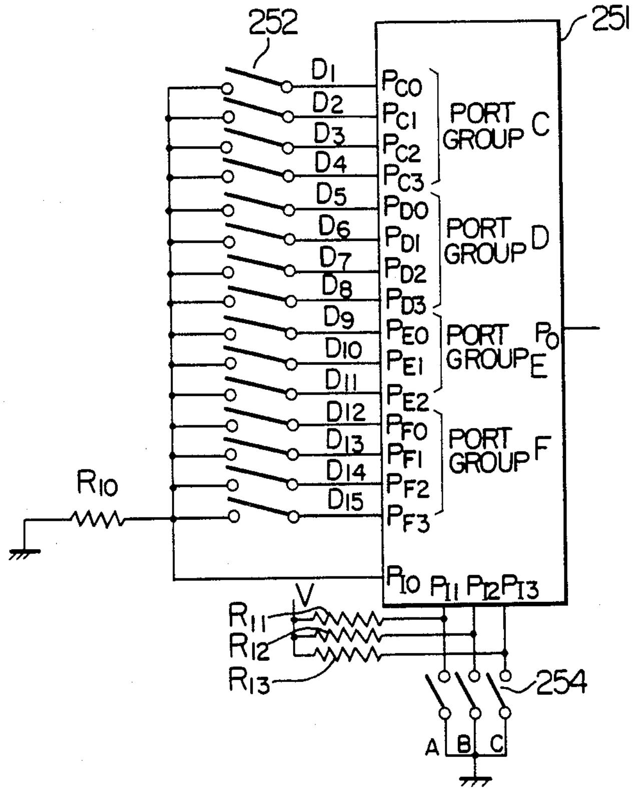
FIG. 14 is a connection diagram in which the signal processing IC is connected with a dip switch and a setting switch.
Figure 12:
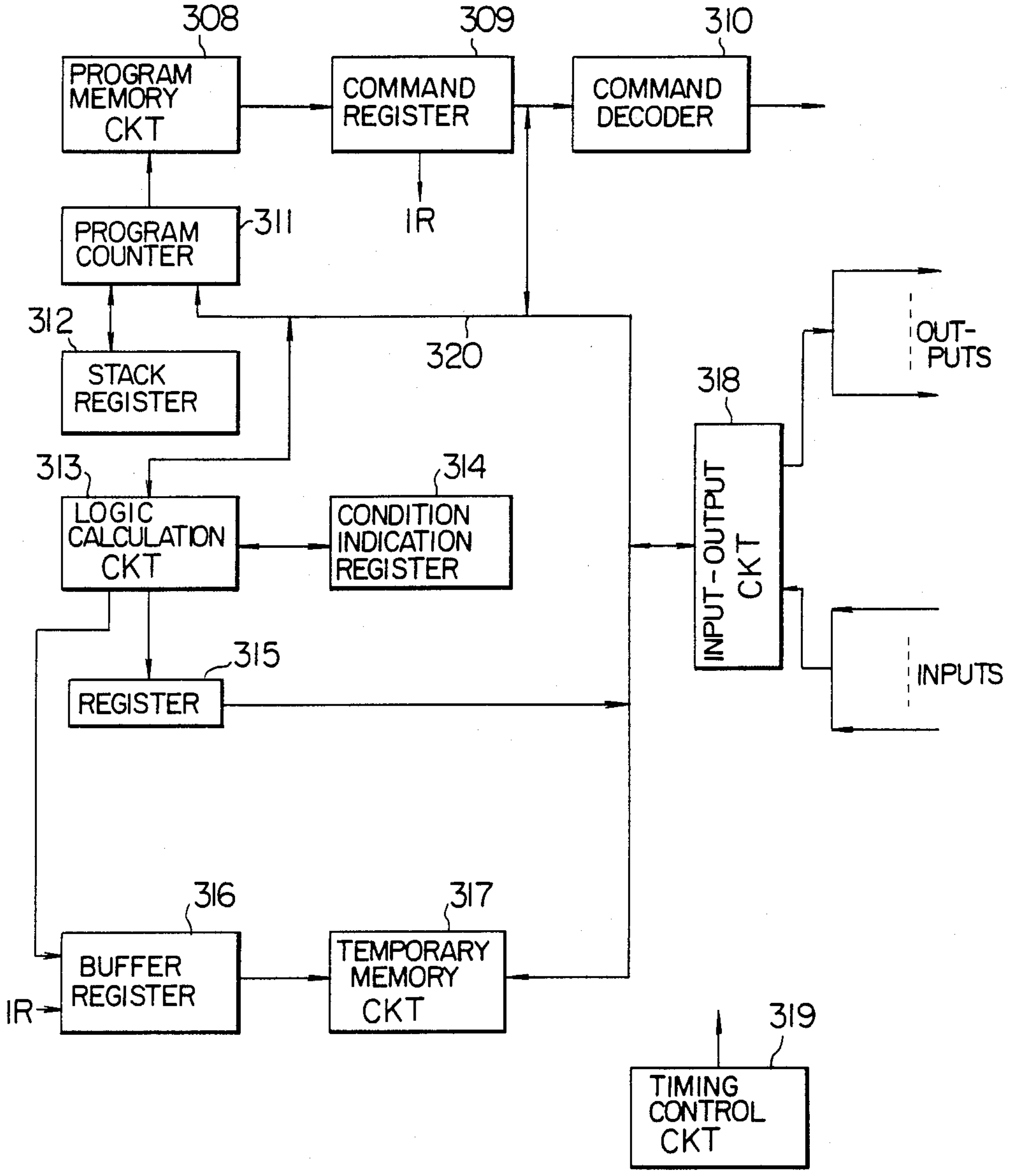
FIG. 12 is a block diagram showing details of a signal processing IC in the embodiment of FIG. 11.

The signal processing IC 251 has an internal structure as schematically shown in FIG. 12, including a temporary memory circuit 317 formed of a random access memory (RAM) having an information storage format as shown in FIG. 13. The dip switch 252, the setting switch 254 for setting data transmission conditions and the signal processing IC 251 are connected as shown in FIG. 14.

In FIG. 12 which schematically shows the internal structure of the signal processing IC 251, a program memory circuit 308 (which is generally a read-only memory (ROM)) for storing programmed data on the processing sequence in advance, a command register 309 for temporarily storing a command code read out of the program memory circuit 308, and a command decoder 310 for decoding the command code stored in the command register 309. The entire circuits are operated in response to a timing pulse produced from a timing control circuit 319 for controlling the operation timing of the entire circuits and the command code. A program counter 311 is provided for designating and updating an address of the command code for the program memory circuit 308. The program counter 311 is connected with a stack register 312 used for storing the return address in the case of a skip such as a subroutine jump. Further, the signal processing IC 251 comprises a logic calculation circuit 313 for logic operation such as binary addition, a condition indication register 314 for temporarily storing the result of the logic calculation, a register 315 such as an accumulator used for logic calculation (including accumulators A and B), and the temporary memory circuit 317 (which generally employs a random access memory (RAM)) for storing the result of logic operation or a status flag. A buffer register 316 is addressed by the logic calculation circuit 315, and the main circuits are connected by a bus line 320.

The bus line 320 is also connected with an input-output circuit 318, so that the input-output condition applied through the bus line 320 is processed by logic decision means including the logic calculation circuit 313, the register 315 and the condition indication register 314. Further, in order to produce a proper output, a particular output port of the input-output circuit 318 is addressed in accordance with the above processing and set to a high or low level.

The temporary memory circuit 317 which plays an especially important role in the above-mentioned processing in this circuit configuration will be described below with reference to FIG. 13. As explained above, the temporary memory circuit 317 is used for temporary storage of the result of calculation or condition flags (information for setting the dip switch).

As shown in FIG. 13, the RAM area is addressed by $D_L$ and $D_H$. The $D_L$ ranges from O to F and the $D_H$ normally contains "0" and "1" levels but in this embodiment, "1" level is not used and only "0" level is indicated in FIG. 13. When the $D_H$ is "0" level, $2^0$, $2^1$, $2^2$ and $2^3$ are designated. Accordingly, taking $D_H(0)$ and $D_L(6)$, for example, $2^3$, $2^2$, $2^1$ and $2^0$ in the $D_H(0)$ designate $D_9$, $D_8$, $D_7$ and ST, respectively. Each of the multiplicity of contents 1 to 40 contained in the 40-bit data shown in FIG. 6 corresponds to each of the 40 areas of $S_H(0) \cdot D_L(0\text{–}9)$. Since the data is represented by the negative logic, the "0" state and the "1" state of the respective areas in the RAM are indicative of the transmission level and the non-transmission level, respectively.

With reference to FIG. 14, an example of the external connection of the signal processing IC 251 will be described in which the signal processing IC 251 is connected to the input dip switch 252 and the setting switch 254 for setting the number of transmissions. The dip switch 252 consisting of a plurality of component switches is on-off controlled by the operator in advance and the thus set information sequentially renders 15 output ports $P_{C0}$ to $P_{F3}$ high at the rate of one bit while rendering the remainder low and is fetched by the temporary memory circuit through a port $P_{I0}$. The data bits $D_1$ to $D_{15}$ correspond to the output ports $P_{C0}$ to $P_{F3}$ grouped into C, D, E and F ports. Each of the output ports $P_{C0}$ to $P_{F3}$ is of an open drain type in which the low level of the output makes the output impedance infinite. Thus, when the output port $P_{C0}$, for example, is rendered high with a component switch 252 corresponding to the data bit $D_1$ turned on, current is passed through a resistor $R_{10}$ so that the port $P_{I0}$ is applied with a high level signal. In this case, even if a component switch 252 corresponding to a port other than the port $P_{C0}$ is turned on, the output port associated with the component switch in question has the infinite impedance, thereby preventing establishment of a short circuit through the component switch of interest. Conversely, when the component switch 252 associated with the output port $P_{C0}$ is turned off, no current is passed through the resistor $R_{10}$ and the port $P_{I0}$ is applied with a low level signal.

The setting switch 254 of three bits adapted to set the number of data transmissions is also set by the operator in advance. The respective bits of the setting switch 254 are connected to the power source through resistors $R_{11}$, $R_{12}$ and $R_{13}$ and hence a bit switch which is turned on applies a low level signal to one of input ports $P_{I1}$ to $P_{I3}$ and a bit switch which is turned off applies a high level signal. The setting condition of the setting switch 254 is related to the number of data transmissions as exemplified in FIG. 15.

Figure 16:
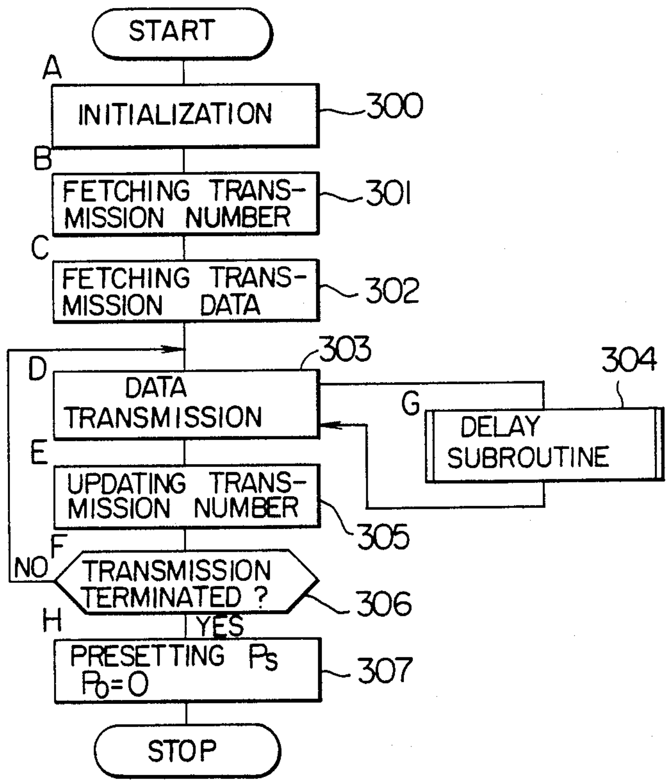
FIGS. 16 through 28 are flow charts useful in explaining the operation of the FIG. 11 embodiment.

FIG. 16 shows a flow chart of the entire operational procedure in this embodiment. In this figure, the "start" of the operation is effected when the operator depresses the push-button switch 228 shown in FIG. 11, followed by initialization in step 300, fetching of a number of data transmissions set by the setting switch 254 in step 301, and fetching of an on-off condition set by the dip switch 252 in step 302. The information fetched in step 302 is stored in the RAM.

The data transmission is then effected in step 303 while the time length of one bit of data is managed in step 304. The processing in step 304 is called a delay subroutine in which the number of no-operation instructions is counted and made correspondent to time, as will be detailed later.

Subsequently, the number of transmissions is updated in step 305 and the completion of the transmission is checked in step 306. If "No" is issued, the procedure jumps to the step 303 and the previous procedure is repeated. If "Yes" is issued, a command output $P_S$, which drives the transistor 255 through which the push-button switch 228 is short-circuited, is reset and rendered low to release the self-holding.

The procedure described so far is repeated each time the power source is turned on for the transmission of data.

Of steps in FIG. 16, the main steps will be described in greater detail with reference to FIGS. 17 through 28.

Figure 17:
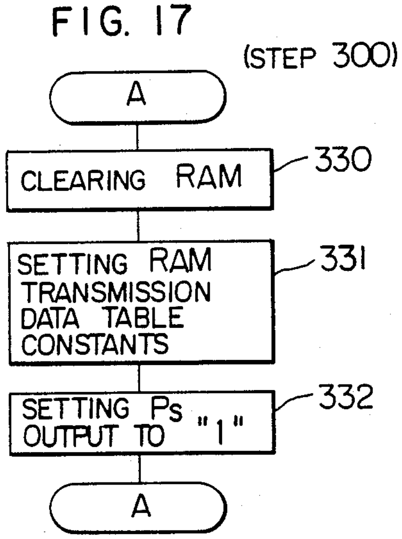

FIG. 17 shows the details of the step 300 through which the processing circuit is initialized.

In step 330, all of the areas in the RAM are cleared. In the next step 331, the transmission data table constants in the RAM are set, through which for the "0" level of the $D_H$, the $2^0$ bit of $D_L(4)$, $2^0$ bit of $D_L(6)$, $2^0$ bit of $D_L(8)$ and $2^3$ bit of $D_L(9)$ are set to "1" as shown in FIG. 13.

In step 332, the $P_S$ output in set to "1" in order that the transistor 255 is turned on to short-circuit the push-button switch 228 therethrough, thus establishing the self-holding circuit.

Figure 18:
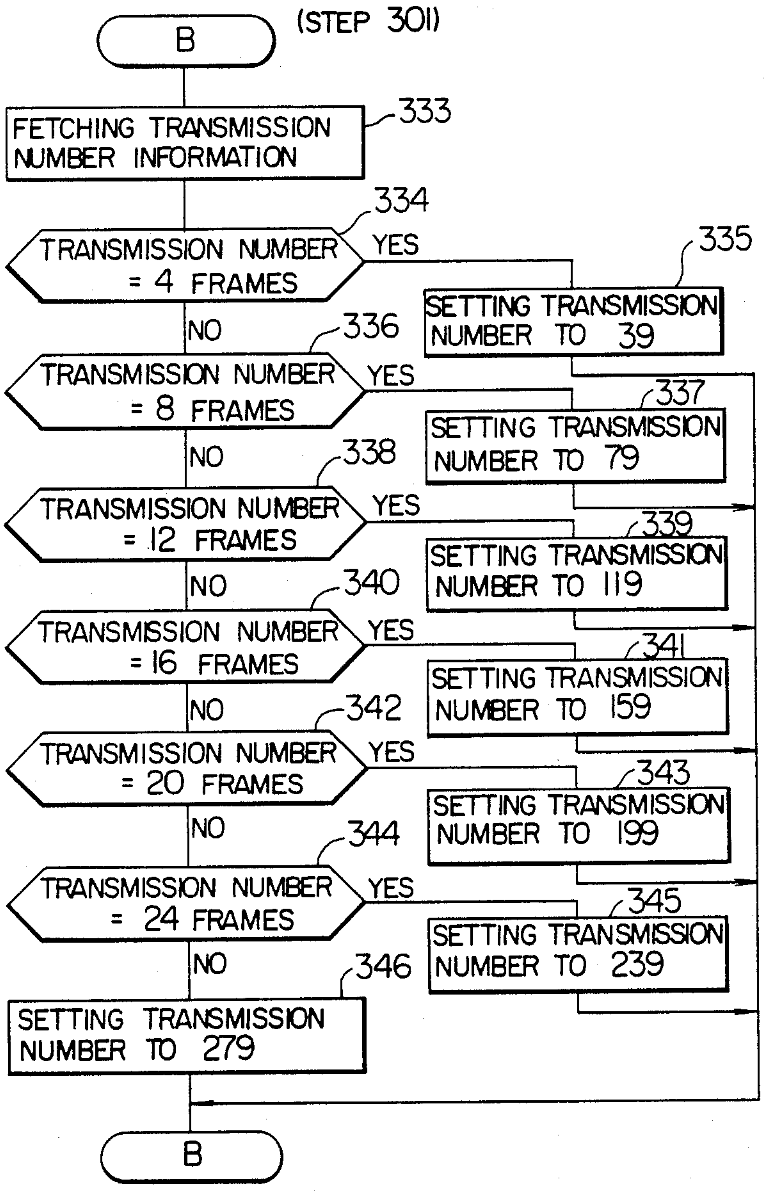

FIG. 18 shows details of the step 301 through which the value set for determining the number of data transmissions is read and decided.

In step 333, a value set by the setting switch 254 is fetched. The value set in this step is made correspondent to the number of transmissions as shown in FIG. 15. The value of three bits set by the setting switch 254 is then read and decided. A unit of the information has one frame consisting of 1 to 40 bits shown in FIG. 6 which are represented by $D_L(0\text{–}9)$ shown in FIG. 13. Accordingly, the unit of the information is read by designating the $D_L$ ten times and therefore, the number of data transmissions in terms of program is set ten times as many as the actual number of data transmissions. However, in view of the fact that the number of transmissions is one when the value is 0 (zero) in decimal, $$(\text{Transmission number}) = (\text{frame number}) \times 10 - 1$$

stands. In step 334, the number of transmissions is checked to see whether or not it corresponds to 4 frames. If the value is 0 (zero) in decimal indicating that the four-frame number is set, "Yes" is issued and in step 335, the transmission number is set to 39. If the value is not 0 (zero), "No" is issued and the transmission number is checked to see if it corresponds to 8 frames in the next step 336. If the value is 1 (one) in decimal indicating 8 frames, "Yes" is issued and the transmission number is set to 79 in the RAM area in step 337. If the value is not 1 (one), "No" is issued and the transmission number is checked to see if it corresponds to 12 frames in step 338. If the value is 2 indicating 12 frames, "Yes" is issued and the transmission number is set to 119 in the RAM area in step 339. If not 2, "No" is issued and the transmission number is checked to see if it corresponds to 16 frames in the next step 340. If the value is 3 indicating 16 frames, "Yes" is issued and the transmission number is set to 159 in the RAM area in step 341. If not 3, "No" is issued and the transmission number is checked to see if it corresponds to 20 frames in the next step 342. If the value is 4 indicating 20 frames, "Yes" is issued and the transmission number is set to 199 in the RAM area in step 343. If not 4, "No" is issued and the transmission number is checked to see if it corresponds to 24 frames in the step 344. If "Yes" is issued in the step 344, the transmission number of 239 is set in the RAM area in step 345. If "No" is issued in the step 344, the transmission number is set to 279 in step 346. As shown in FIG. 13, the number of transmissions is set in $D_L$ (D, E, F) in the RAM area and specifically, in accordance with $2^0$, $2^1$, $2^2$ and $2^3$ of the $D_H(0)$, the $D_L(D)$ area stores 100-th digit numbers, $D_L$ (E) area stores 10-th digit numbers and $D_L$ (F) area stores 1st digit numbers.

Figure 19:
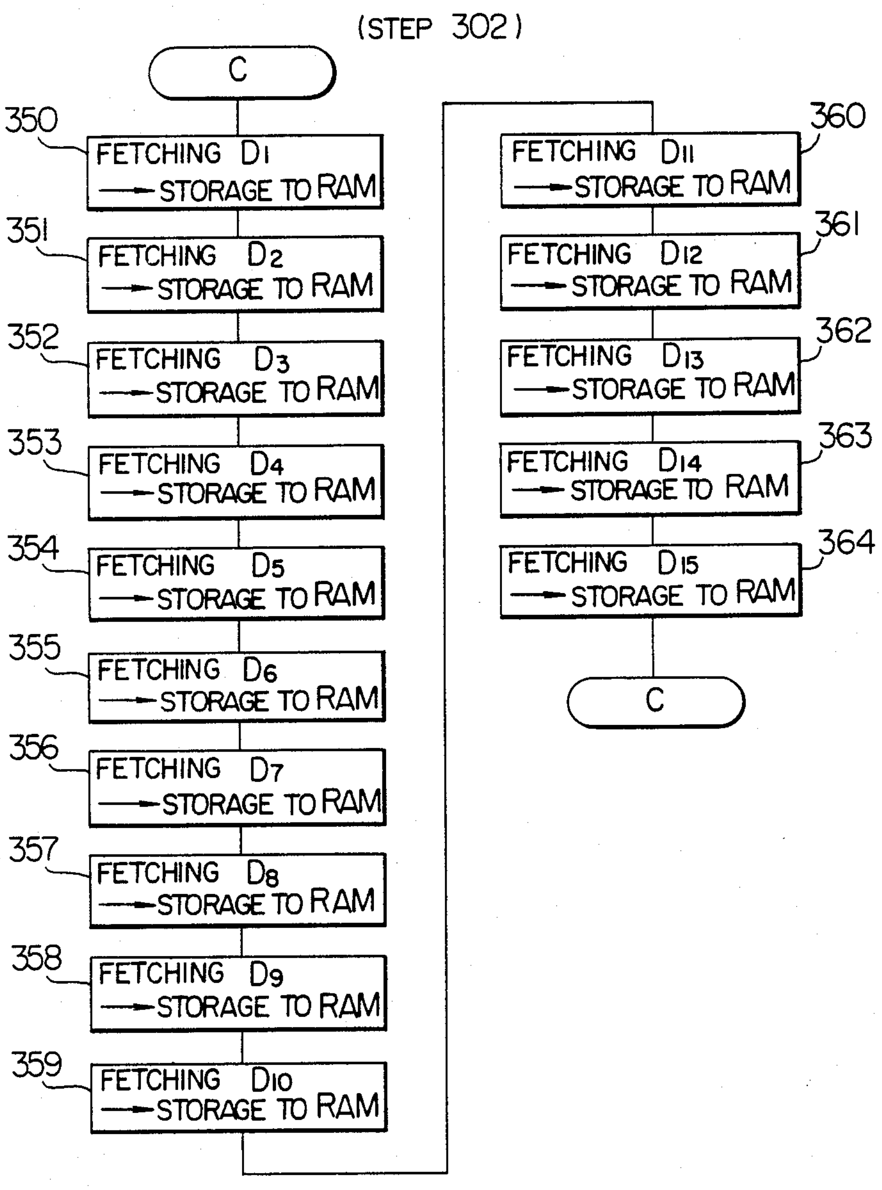
Figure 20:
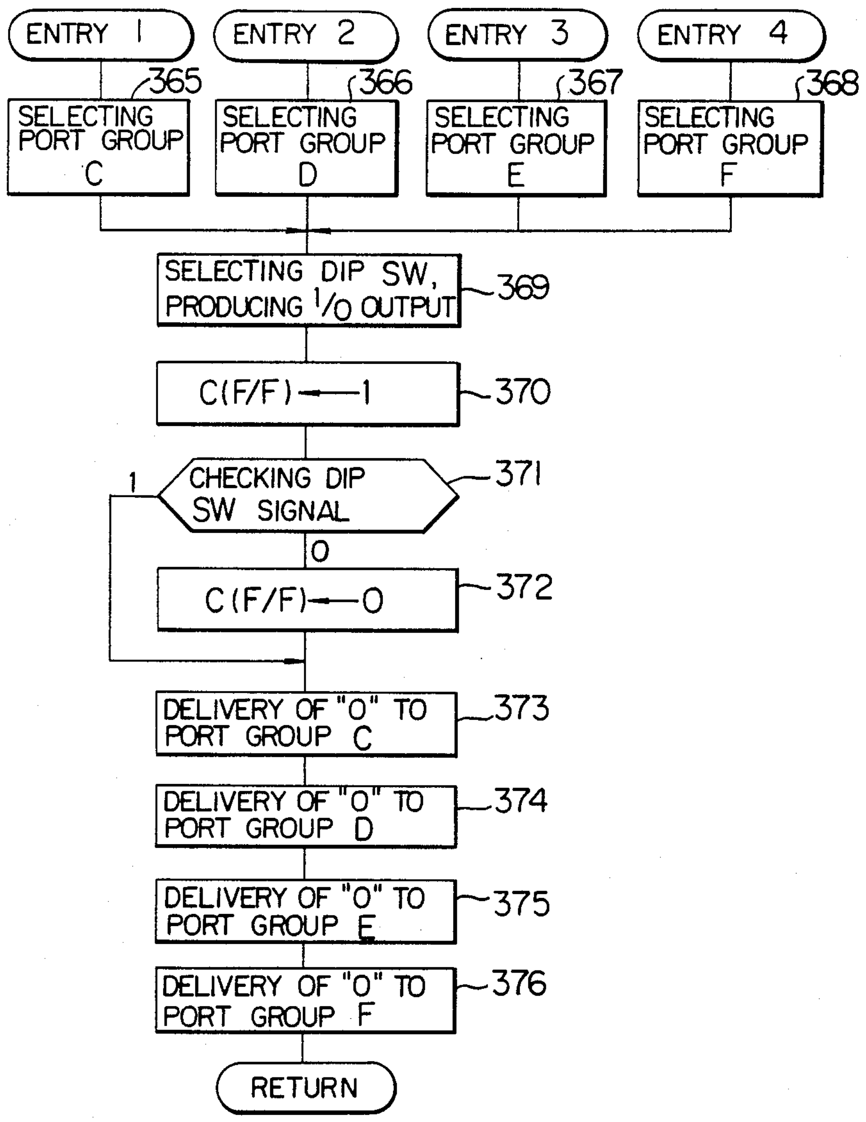

FIG. 19 shows details of the step 302. In this figure, throughout steps 350 to 364, the high level outputs corresponding to the bits $D_1$ to $D_{15}$ are sequentially delivered to the associated ports $P_{C0}$ to $P_{F3}$ and the on or off state of the dip switch 252 is read and stored in the corresponding RAM area shown in FIG. 13. Each of the bits corresponding to each of the ports is read by way of a subroutine, details of which are illustrated in FIG. 20. The read-out value is stored in the RAM area by way of a subroutine, details of which are illustrated in FIGS. 21 to 25.

The contents of the subroutine as shown in FIG. 20 will now be described. Since a 4-bit microcomputer is used in this embodiment, the unit of processing is 4 bits/port. Accordingly, the bits to be read are processed to select a port group they correspond to. More particularly, when the data $D_1$ to $D_4$ in FIG. 19 are to be fetched, the procedure jumps to ENTRY 1 and the port group C is selected in step 365. Similarly, when the data $D_5$ to $D_8$ are to be fetched, the procedure jumps to ENTRY 2 and the port group D is selected in step 366;

when the data $D_9$ to $D_{11}$ are to be fetched, the port group E is selected in step 367; and when the data $D_{12}$ to $D_{15}$ are to be fetched, the port group F is selected in step 368. Thereafter, it is decided which component switches of the dip switch 252 are correspondent to the selected port group and an output is produced on a given bit in step 369. For example, when the port $P_{C2}$ is desired to be rendered high, the port group C is selected in step 365 and "0010" is produced in step 369. Next, "1" is set to a C(F/F) in step 370. Here, the C(F/F) is equivalent to the condition indication register 314 shown in FIG. 12. Subsequently, the value as applied to the input port $P_{I0}$ shown in FIG. 14 is read. Through processing in step 371, the procedure jumps to step 372 if the read value is "0" and to step 373 if it is "1". This indicates that a component switch of the dip switch 252 associated with the bit is turned off when the read value is "0" and a component switch associated with the bit is turned on when "1". In the step 372, "0" is set to the C(F/F). Thereafter, to return each port group to the initial state, "0000" is applied to the port group C in step 373, to the port group D in step 374, to the port group E in step 375 and to the port group F in step 376.

With reference to FIGS. 21 to 24, the processing for storing the value read by the condition indication register 314 into a corresponding area of the RAM 317 will be described.

Figure 21:
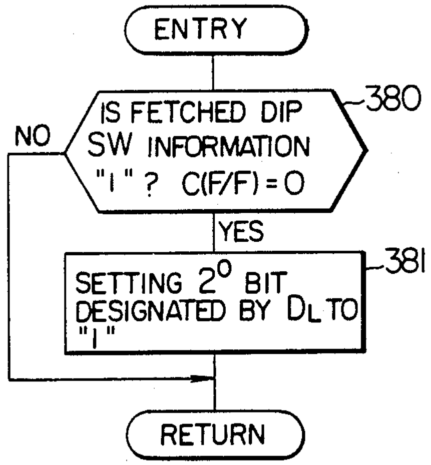

Shown in FIG. 21 is the processing for setting the data to the $2^0$ bit position of $D_H$ (0) in the RAM area. The $2^0$ bit data contains $D_4$ and $D_{10}$ as will be seen from FIG. 13 and the procedure coming across steps 353 and 359, therefore, goes into ENTRY in FIG. 21. Subsequently, the contents of the C(F/F) are checked in step 380. If the contents correspond to "0", "1" is set to a $2^0$ bit position designated by the $D_L$, for example, an area defined by $D_L$ (5) and $2^0$ of $D_H$(0) in step 381. If "1", the procedure directly goes to subroutine return.

Figure 22:
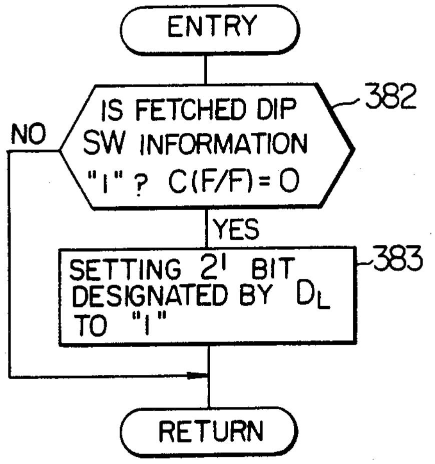

Shown in FIG. 22 is the processing for setting the data to a $2^1$ bit position in the RAM area. Data to be processed in this processing area $D_1$, $D_5$, $D_7$, $D_{11}$ and $D_{13}$ and $D_L$ (4, 5, 6, 7, 8) is designated. The contents of the C(F/F) are checked in step 382 and if the contents correspond to "0", "1" is set to a $2^1$ bit position designated by the $D_L$ in step 383. If "1", the procedure directly goes to subroutine return.

Figure 23:
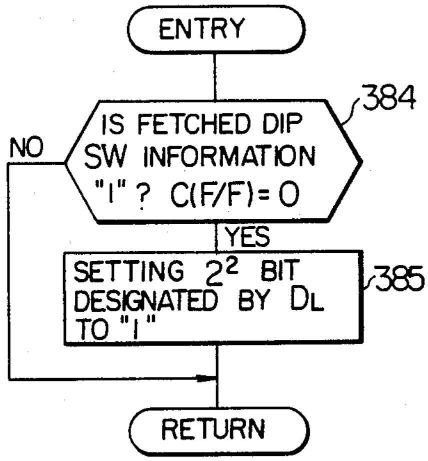

Shown in FIG. 23 is the processing for setting the data to a $2^2$ bit position in the RAM area. Data to be processed in this processing are $D_2$, $D_6$, $D_8$, $D_{12}$ and $D_{14}$. The contents of the C(F/F) are checked in step 384 and if the contents correspond to "0", "1" is set to a $2^2$ bit position designated by the $D_L$ in step 385. If "1", the procedure directly goes to subroutine return.

Figure 24:
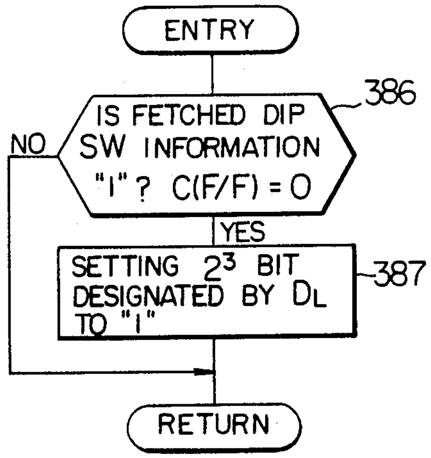

Shown in FIG. 24 is the processing for setting the data to a $2^3$ bit position in the RAM area. Data to be processed in this processing are $D_3$, $D_9$ and $D_{15}$. The contents of the C(F/F) are checked in step 386 and if the contents correspond to "0", "1" is set to a $2^3$ bit position designated by the $D_L$ in step 387. If "1", the procedure directly goes to subroutine return.

Figure 25:
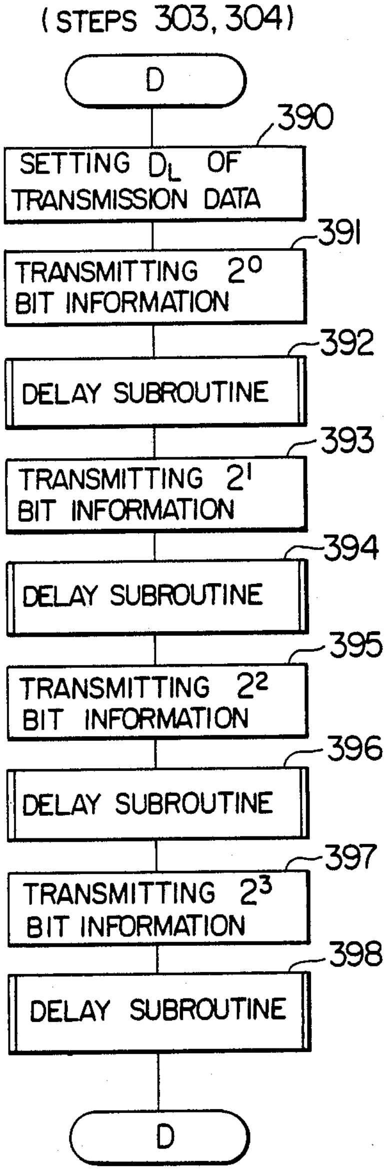

Turning now to FIG. 25, details of the step 303 for data transmission and of the subroutine step 304 for determination of the data length of one bit are illustrated. A $D_L$ address of the data to be transmitted at present is first set in step 390. Subsequently, the $2^0$ bit information is transmitted in step 391. When the $2^0$ bit is "0", an output $P_0$ of the signal processing IC produces "1" and when the $2^0$ bit is "1", the output $P_0$ produces "0". After the delivery of the output, the procedure jumps to delay subroutine step 392. In this step, the time corresponding to one bit length is determined as will be detailed later. The $2^1$ bit information is now transmitted in step 393. As mentioned previsouly, when the $2^1$ bit is "0", the output $P_0$ produces "1" and when the $2^1$ bit is "1", the output $P_0$ produces "0". After the delivery of the output, one bit length time is determined in delay subroutine step 394. Subsequently, the $2^2$ bit information is transmitted in step 395. Similarly, when the $2^2$ bit is "0", the output $P_0$ produces "1" and when "1", it produces "0". Following the delivery of the output, one bit length time is determined in delay subroutine step 396. Thereafter, the $2^3$ bit information is transmitted in step 397. Similarly, when the $2^3$ bit is "0", the output $P_0$ produces "1" and when "1", it produces "0". With the "1" output from the output $P_0$, the transmitter circuit 253 is driven but with the output "0" from the output $P_0$, it is not driven and the transmission is stopped. After the delivery of the output, one bit length time which is different from that for the $2^0$, $2^1$, and $2^2$ bit information is determined in subroutine step 398. Specifically, as shown in the main flow chart, the step 398 is followed by the steps 305 and 306 and it is necessary to reduce the one bit length time in the step 398 so as to save the execution time required in the subsequent steps 305 and 306. The same delay time in the steps 392, 394 and 396 is called DLAY 1 and the delay time in the step 398 is called DLAY 2.

Figure 26:
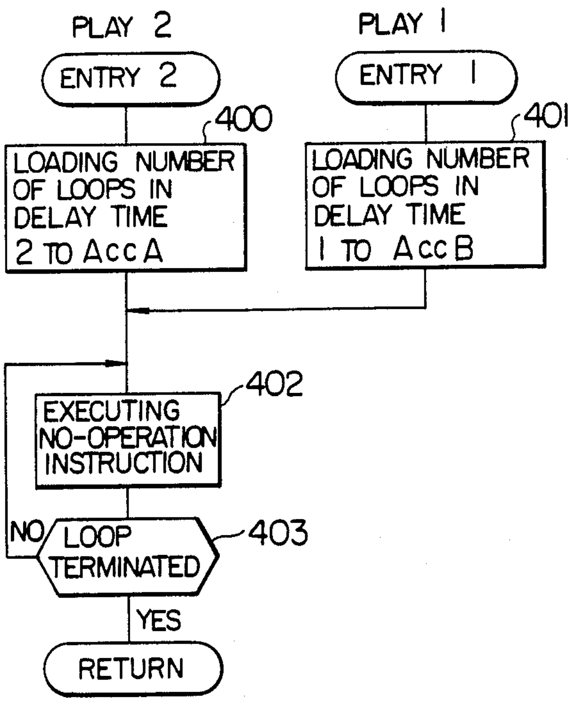

Thus, reference is now made to FIG. 26 which illustrates a subroutine for preparation of the DLAY 1 and DLAY 2.

By executing this subroutine, a time of 1.72 m seconds is set up in the case of DLAY 2 and a time of 1.95 m seconds in the case of DLAY 1. The procedure jumps to ENTRY 2 in the case of DLAY 2 and a value equivalent to the time is set to an accumulator A in step 400. In the case of DLAY 1, the procedure jumps to ENTRY 1 and a value equivalent to the time is set to an accumulator B in step 401. The accumulators referred to herein correspond to the condition indication register 315 shown in FIG. 12. Thus, the value set to the accumulators represents the loop number to be judged in step 403. The number of repetitious executions of the no-operation instruction in step 402 is related to the aforementioned time.

Figure 27:
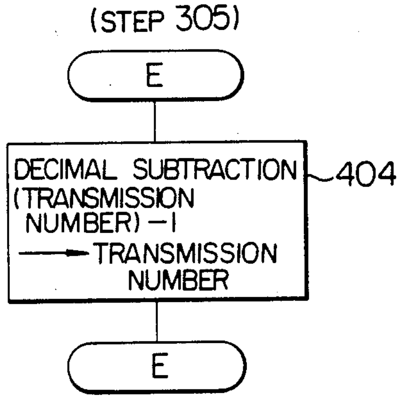

Shown in FIG. 27 are details of the step 305. The number of transmissions stored in the $D_L$ (D, E, F) in the RAM area is decreased by 1 (one) in step 404.

Figure 28:
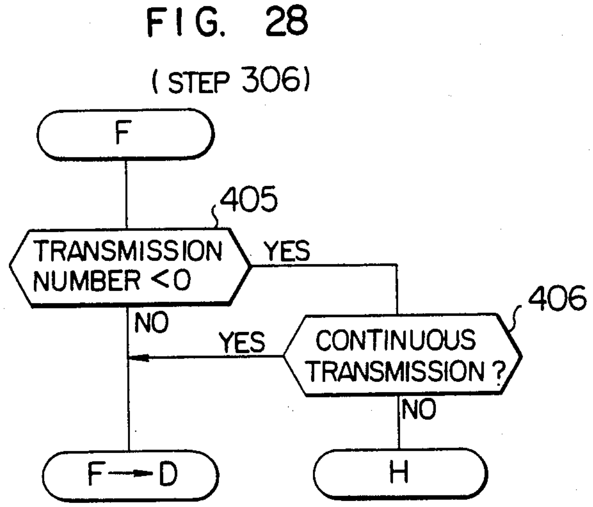

Shown in FIG. 28 are details of the step 306. The transmission number resulting from the execution of the step 404 is checked as to if it is negative in step 405. If not negative, the procedure again jumps to the step 303 and new data is transmitted. If negative, the procedure goes to step 406 in which the ports $P_{I1}$, $P_{I2}$ and $P_{I3}$ are checked. If "111" is applied to these ports, indicating the continuous transmission mode as shown in FIG. 15, the procedure again jumps to the step 303 and the data is transmitted. If the decision in step 406 shows a code other than "111", indicating that the prescribed number of transmissions has been completed, the output $P_S$ is reset in the step 307 to release the self-holding. Thus, even when the push-button switch 228 is kept turned on, "0" is set to the port $P_0$ by the last data transmission to prevent the transmitter circuit 253 from being driven.

Figures 29, 30:
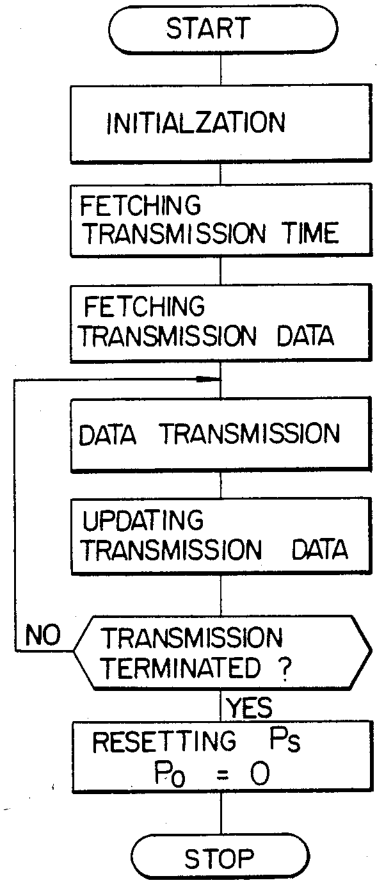
FIG. 29 is a flow chart showing the operation of another embodiment according to the invention.
FIG. 30 is a diagrammatic representation showing an example of setting the transmission time in the flow chart of FIG. 29.

The invention will now be described by way of another embodiment directed to an apparatus having a configuration similar to FIG. 11. The foregoing embodiment as described with reference to FIGS. 18 to 28 is based on the program aiming at the number of transmissions of the door operation command signal but in contrast, an embodiment to be described below is based on the transmission time. FIG. 29 shows a flow chart of this embodiment and FIG. 30 shows an example of setting of the transmission time. This embodiment wherein the transmission time of the door operation command signal is prescribed on the basis of the clock pulse of the transmitter utilizes, in essence, the controlling of the number of transmissions and the program shown in FIG. 29 is similar to that of FIG. 16.

Figure 31:
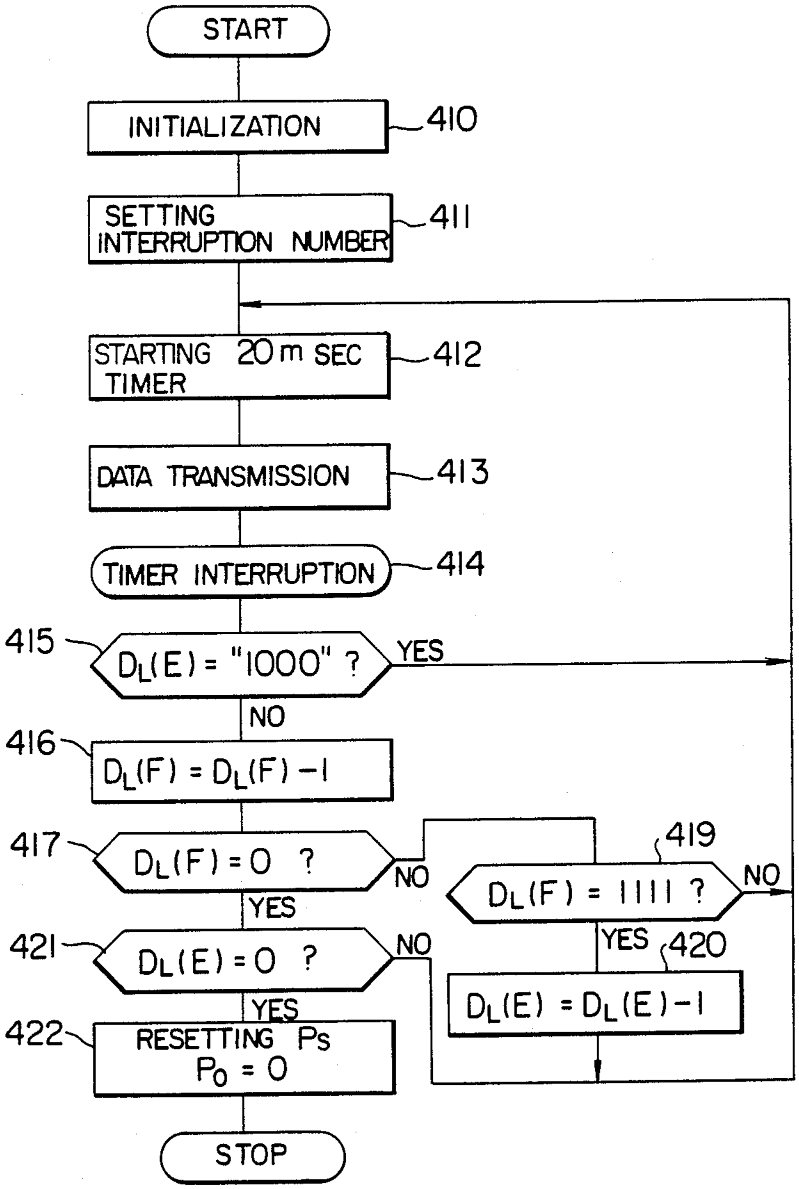
FIG. 31 is a flow chart showing the operation of still another embodiment according to the invention.

Still another embodiment based on the transmission time is shown in FIG. 31. In this embodiment, the procedure is started by transmission operation, initialization is effected in step 410, and the number of interruptions is set in step 411. The setting of the number of interruptions is effected by the setting switch 254 shown in FIG. 14 and stored in $D_L$ (E, F) in the RAM area. Setting condition of the setting switch, the number of interruptions and the storage format of the RAM area are tabulated in Table 3.

TABLE 3

| Setting switch | | | Number of | RAM area | |
|---|---|---|---|---|---|
| C | B | A | interruptions | $D_L$ (E) | $D_L$ (F) |
| 0 | 0 | 0 | 8 | 0000 | 1000 |
| 0 | 0 | 1 | 16 | 0001 | 0000 |
| 0 | 1 | 0 | 24 | 0001 | 1000 |
| 0 | 1 | 1 | 32 | 0010 | 0000 |
| 1 | 0 | 0 | 40 | 0010 | 1000 |
| 1 | 0 | 1 | 48 | 0011 | 0000 |
| 1 | 1 | 0 | 56 | 0011 | 1000 |
| 1 | 1 | 1 | ∞ | 1000 | 0000 |

Next, a 20 msec timer is started in step 412 and thereafter the data is transmitted in a manner as described hereinbefore in step 413. The data transmission is repeated continuously. When the timer started in step 412 measures a 20 msec lapse of time in the process of the data transmission, a timer interruption is executed in step 414 and the contents of $D_L$ (E) in the RAM area are checked as to if they are "1000" in step 415. As will be seen from Table 3, it is decided through the judgement in step 415 whether or not the continuous transmission is set. If "Yes" is issued, the timer is again started in the step 412. If "No" is issued, indicating that the continuous transmission is not set, the contents of $D_L$ (F) in the RAM area are decreased by 1 (one) in step 416 and then checked to see if they are 0 (zero) in step 417. If "No" is issued indicating that the transmission time has not yet been completed, the timer is again started. Prior to starting of the timer, the contents of $D_L$ (F) in the RAM area are checked to see if they are "1111" in step 419. If "No" is issued, the procedure jumps to step 412 and the timer is restarted. If "Yes" is issued, the 10-th digit of the interruption number (contents of $D_L$ (E) in the RAM area) is decreased by 1 (one) and thereafter the timer is restarted in step 412. If "Yes" is issued from step 417, indicating that the 1st digit of the interruption number is "0" but it is necessary to check whether or not the 10-th digit is "0", the $D_L$ (E) is checked to see if it is "0" in step 421. If the $D_L$ (E) is not "0" indicating that the transmission time has not yet been completed, the procedure returns to the step 412 and the timer is again set. If "Yes" is issued from the step 421, indicating that the transmission time has been completed, the data transmission is stopped in step 422 and the program is stopped.

As has been described, according to this invention, when the push-button switch for transmission of the door operation command signal is kept turned on beyond the predetermined time, the transmission of the door operation command signal is automatically stopped at the termination of the predetermined time, so that the garage door can be controlled to a safe condition by the signal from the obstruction detecting switch even when the push-button switch is closed for a long time. Further, even when the remote control command is transmitted from a running car, the signal received by the receiver is not interrupted under the influence of a shielding body and the door operation control in opposition to the intention of the operator is prevented. In addition, in the transmitter powered from a battery, the shortened transmission time of the door operation command signal can reduce power consumption in the battery.

What is claimed is:

1. Apparatus for door operation remote control comprising:

a radio transmitter for transmitting a door operation command signal, said radio transmitter including operation switch means for generating a door operation command, transmitter means responsive to the operation of said operation switch means for transmitting said door operation command signal repeatedly as a succession of signals and transmission of the door operation command signal transmission stopping means for stopping a given transmitting operation of said transmitter means at the termination of a predetermined period of time from operation of said operation switch means so as to limit the number of signal transmissions of said door operation command signal to a predetermined number;

a radio receiver for receiving the door operation command signal from said radio transmitter;

control means responsive to the door operation command signal received by said receiver to generate a door operation control signal; and door operation drive means responsive to the door operation control signal from said control means to drive the operation of a door.

2. Apparatus for door operation remote control according to claim 1 wherein said transmitter means comprises means for generating a pulse each time said transmitter means effects one signal transmission of the door operation command signal, and wherein said transmission stopping means comprises a counter generating a transmission stopping signal when it counts the pulse from said pulse generating means a predetermined number of times, and wherein said transmitter means further includes transmitting operation stop means resonsive to the transmission stopping signal to stop the transmitting operation of said transmitter means.

3. Apparatus for door operation remote control according to claim 1 wherein said transmission stopping means comprises timer means responsive to the operation of said operation switch means to measure a predetermined time and generate a transmission stopping signal at the termination of the measurement, and wherein said transmitter means includes means responsive to the transmission stopping signal to stop the transmitting operation of said transmitter means.

4. Apparatus for door operation remote control according to claim 3 wherein said timer means comprises a monostable multivibrator.

5. Apparatus for door operation remote control according to claim 2 or 3 wherein said transmitting operation stop means is a self-holding circuit for establishing self-holding of a power supply circuit for said transmitter means in response to the operation of said switch and the releasing the self-holding condition in response to the transmission stopping signal.

6. Apparatus for door operation remote control according to claim 5 wherein said transmitting operation stop means further comprises means responsive to the transmission stopping signal to stop the generation of the door operation command signal by said transmitter means.

7. Apparatus for door operation remote control comprising:

a radio transmitter for transmitting a door operation command signal, said transmitter including an operation switch for generating a door operation command, transmitter means responsive to the operation of said switch to transmit the door operation command signal, transmission stopping means for stopping a given transmitting operation of said transmitter means at the termination of the transmitting operation of said transmitter means;

a radio receiver for receiving the door operation command signal from said radio transmitter;

control means responsive to the door operation command signal received by said receiver to generate a door operation control signal; and door operation drive means responsive to the control signal from said control means to drive the operation of a door wherein said transmitter means comprises means for generating said door operation command signal in accordance with programmed data on processing sequence stored in a memory in advance, and wherein said transmission stopping means comprises means for setting the number of interruptions, timer means for measuring a predetermined interruption period, means responsive to the operation of said switch to start the timer means, for applying an interruption when said timer means is started and thereafter completes the measurement of the predetermined interruption period, means responsive to the interruption by said interruption applying means to check if the number of interruptions reaches a preset number of interruptions, means for restarting said timer means when said checking means decides that the present number of interruptions is not reached, and means for stopping the transmitting operation when said checking means decides that the present number of interruptions is reached.

8. Apparatus for door operation remote control comprising:

a radio transmitter having means including push-button switch for generating a door operation command, door operation command signal generator means responsive to the operation of said push-button switch to repeatedly generate a door operation command signal formed as one frame including synchronous bits and data bits, transmitter circuit means for modulating said door operation command signal with a high frequency signal to transmit said modulated signal, and a power supply;

a radio receiver for receiving the door operation command signal from said radio transmitter;

control means responsive to the door operation command signal received by said receiver to generate a door operation control signal; and door operation drive means responsive to the control signal from said control means to drive the operation of a door;

wherein said radio transmitter further comprises transmission stopping means including counter means for counting the number of frames forming said door operation command signal generated by said door operation command signal generator means and means for stopping the generation of said door operation command when the count value of said counter reaches a predetermined value.

9. Apparatus for door operation remote control according to claim 8, wherein said transmission stopping means further includes switching means connected in parallel to said push-button switch and means for turning on said switching means when the counted value of said counter means is less than said predetermined value.

10. Apparatus for door operation remote control according to claim 8, wherein said door operation command signal generator means and said transmitter circuit are connected to said power supply through said push-button switch, and wherein said transmission stopping means has a transistor which is turned on when the counted value of said counter means is less than said predetermined value.

11. Apparatus for door operation remote control according to claim 8, wherein said door operation command signal generator means and said transmission stopping means include a signal processing circuit having memory means, and means for setting a predetermined number, and switch means for setting said data bits, said signal processing means executing:

a process for storing a value set to said predetermined number setting means in said memory means;

a process for storing in said memory means said data bits of said door operation command signal by means of said data bit setting switch means;

a process for repeatedly transmitting said data;

a process for counting the number of the data transmission; and a process for stopping the transmission of said data when the number of data transmission reaches said predetermined number stored in said memory means.

12. Apparatus for door operation remote control according to claim 8, wherein said door operation command signal generator means and said transmission stopping means include a signal processing circuit having memory means, and means for setting a predetermined period of time, and switch means for setting said data bits, said signal processing means executing:

a process for storing a value set to said predetermined period of time setting means in said memory means;

a process for storing in said memory means said data bits of said door operation command signal by means of said data bit setting switch means;

a process for repeatedly transmitting said data;

a process for measuring a time of the data transmission; and a process for stopping the transmission of said data when the time of data transmission reaches said predetermined perid of time stored in said memory means.

* * * * *